United States Patent [19]

Fukui

[11] Patent Number: 5,764,289
[45] Date of Patent: Jun. 9, 1998

[54] SOLID-STATE IMAGE PICK-UP APPARATUS

[75] Inventor: Hiroshi Fukui, Kanagawa, Japan

[73] Assignee: Sony Corporation, Tokyo, Japan

[21] Appl. No.: 832,754

[22] Filed: Apr. 4, 1997

Related U.S. Application Data

[63] Continuation of Ser. No. 416,859, filed as PCT/JP94/01439, Aug. 31, 1994, Pat. No. 5,663,761.

[30] Foreign Application Priority Data

Sep. 2, 1993 [JP] Japan ........................... 5-218575

[51] Int. Cl.$^6$ ..................................... H04N 3/14
[52] U.S. Cl. ............................. 348/323; 348/312
[58] Field of Search ................... 348/312, 322, 348/323, 321, 316

[56] References Cited

U.S. PATENT DOCUMENTS

| | | | |
|---|---|---|---|
| 4,314,279 | 2/1982 | Yoshida | 348/316 |
| 4,455,575 | 6/1984 | Murakoshi | 348/322 |
| 4,472,741 | 9/1984 | Takatsu et al. | 348/323 |
| 4,837,630 | 6/1989 | Ueda | 348/321 |
| 5,025,318 | 6/1991 | Nagura | 348/324 |
| 5,148,013 | 9/1992 | Yamada | 348/316 |
| 5,663,761 | 9/1997 | Fukui | 348/323 |

*Primary Examiner*—Wendy Garber
*Attorney, Agent, or Firm*—Frommer Lawrence & Haug LLP; William S. Frommer

[57] ABSTRACT

With respect to respective image pick-up signals $S_{ODD}/S_{EVEN}$, $S_{EVEN}/S_{ODD}$ of fields different from each other which have been simultaneously read out by two lines from CCD image sensor (11) of imaging section (10), standard television signals $S_{OUT1}$, $S_{OUT2}$ of 2 channels are formed by first and second process processing circuits (31), (32) of process processing section (30) to output these standard television signals of 2 channels from first and second output terminals (61), (62).

1 Claim, 18 Drawing Sheets

SOLID-STATE IMAGE PICK-UP APPARATUS

This application is a continuation of application Ser. No. 08/416,859, filed Apr. 17, 1995, filed as PCT/JP94/01439 Aug. 31, 1994 now U.S. Pat. No. 5,663,761.

TECHNICAL FIELD

This invention relates to a solid-state image pick-up apparatus using two line simultaneous read-out type solid-state image sensor in which image pick-up information of all pixels are line-sequentially read out by two lines every one field.

BACKGROUND ART

Hitherto, in order to cope with High Definition (HD) television system such as so called high vision, etc., realization of higher resolution of video cameras is being developed. At the image pick-up (imaging) section of the solid-state image pick-up (imaging) apparatus, as a solid-state image sensor of the Progressive Scan system adapted for reading out image pick-up information of all pixels every field, there is used, e.g., a two line simultaneous read-out type CCD image sensor in which image pick-up information of all pixels are line-sequentially read out by two lines every one field.

This two line simultaneous read-out type CCD image sensor comprises, as shown in FIG. 1, for example, respective vertical transfer register sections VR formed in a vertical direction along light receiving sections $P_O$, $P_E$ arranged in a matrix form in correspondence with respective pixels, and two horizontal transfer register sections $HR_1$, $HR_2$ provided in parallel at the terminating portions of these vertical transfer register sections VR. In this CCD image sensor, respective image pick-up information obtained by the light receiving sections $P_O$, $P_E$ are transferred independently each other to the two horizontal register sections $HR_1$, $HR_2$ by two lines every one horizontal scanning period through the vertical transfer register sections VR, and image pick-up information of all pixels are read out through respective signal output terminals $T_1$, $T_2$ from the two horizontal transfer register sections $HR_1$, $HR_2$ every one field.

Moreover, in the solid-state image pick-up apparatus using two line simultaneous read-out type CCD image sensor, image pick-up information of all pixels are line-sequentially read out by two lines every one field to form high definition television signals from respective image pick-up signals $S_{ODD}$, $S_{EVEN}$ to output them, or to form a television signal of one channel in conformity with the standard television system such as NTSC system, etc. from respective image pick-up signals $S_{ODD}$, $S_{EVEN}$ by signal processing to carry out additive synthesis through field memory, or the like, thus to output such television signal.

Here, since interlace scanning is employed in the standard television system such as NTSC system, etc., ordinary one line read-out type CCD image sensor is adapted to cope with the above-mentioned interlace scanning in a manner as described below.

Namely, in the frame storage mode where charge storage (time) period of each light receiving section is caused to be one frame (time) period, an approach is employed to read out image pick-up charges obtained at light receiving sections of odd lines as image pick-up output of odd field, and to read out image pick-up charges obtained at light receiving sections of even lines as image pick-up output of even field to thereby obtain an interlaced image pick-up output.

Moreover, in the field storage mode where charge storage (time) period of each light receiving section is caused to be one field (time) period, an approach is employed to additively mix image pick-up charges obtained at light receiving sections of odd lines and image pick-up charges obtained at light receiving sections of even lines to read out them to switch, in upper and lower directions, lines to be added every one field to thereby obtain an interlaced image pick-up output.

As stated above, in ordinary CCD image sensor adapted to cope with interlace scanning, it is impossible to allow resolution with respect to object having movement (motion), i.e., dynamic resolution to be high.

In view of this, in industrial image pick-up apparatuses adapted for imaging (image-pick up), as still picture, object mounted on a transfer body such as a belt conveyer, etc., stroboscope, mechanical shutter or electronic shutter function of CCD image sensor is used to ensure higher dynamic resolution.

Meanwhile, in the solid-state image pick-up apparatus using two line simultaneous read-out type CCD image sensor, if there is employed an approach to form high definition television signals from respective image pick-up signals $S_{ODD}$, $S_{EVEN}$ in which image pick-up information of all pixels are line-sequentially read out by two lines every one field, high speed signal processing is required for forming high definition television signal. Moreover, if there is employed an approach to output such television signal as a television signal of one channel in conformity with the standard television system, one frame (time) period is required for outputting image pick-up information of all pixels.

Further, image pick-up output by industrial image pick-up apparatus permits implementation of picture processing of high accuracy by using image pick-up information of all pixels of one frame.

In addition, while no interlaced image pick-up output is required in industrial image pick-up apparatuses in which image pick-up pictures are processed by computer, those apparatuses are caused to handle television signals in conformity with the standard television system to thereby permit employment of general devices for peripheral equipment or interface, thereby making it possible to easily construct system.

In view of actual circumstances as described above, an object of this invention is to provide a solid-state image pick-up apparatus suitable as an industrial image pick-up apparatus, which is capable of outputting image pick-up information of all pixels of one frame within one field period.

Another object of this invention is to provide a solid-state image pick-up apparatus which can form standard television signals of 2 channels from respective image pick-up signals by the two line simultaneous read-out type solid state image sensor to output such standard television signals.

A further object of this invention is to provide a solid-state image pick-up apparatus capable of outputting, as non-interlaced television signals of 2 channels, respective image pick-up signals of fields different from each other which have been simultaneously read out by 2 lines from the two line simultaneous read-out type solid-state image sensor.

A still further object of this invention is to provide an imaging system suitable for industrial purpose which can output, within one field time period, image pick-up information of all pixels of one frame.

DISCLOSURE OF THE INVENTION

A solid-state image pick-up apparatus according to this invention comprises: a plurality of pixels arranged in a matrix form; a two line simultaneous read-out type solid-state image sensor including two signal output terminals for outputting, as an image pick-up signal, image pick-up information obtained at the plurality of pixels to read out image pick-up information of all pixels every field to alternately output, with the relationship of phases opposite to each other, an image pick-up signal of odd line and an image pick-up signal of even line from the two signal output terminals; first process processing means for forming a television signal in conformity with the standard system from an image pick-up signal outputted through one signal output terminal of the solid-state image sensor; and second process processing means for forming a television signal in conformity with the standard system from an image pick-up signal outputted through the other signal output terminal of the solid-state image sensor, thus to output, as standard television signals of 2 channels, respective image pick-up signals of fields different from each other which have been respectively read out from the solid-state image sensor.

Moreover, the solid-state image pick-up apparatus according to this invention further comprises: a first synchronizing signal generator for generating a first synchronizing signal corresponding to respective fields of an image pick-up signal outputted through one signal output terminal of the solid-state image sensor; and a second synchronizing signal generator for generating a second synchronizing signal corresponding to respective fields of an image pick-up signal outputted through the other signal output terminal of the solid-state image sensor, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the solid-state image pick-up apparatus according to this invention includes a synchronizing signal generator for generating a synchronizing signal corresponding to respective fields of an image pick-up signal outputted through one signal output terminal of the solid-state image sensor, wherein the first and second process processing means carry out process processing on the basis of the synchronizing signal delivered from the synchronizing signal generator.

A solid-state image pick-up apparatus according to this invention comprises: a plurality of pixels arranged in a matrix form; a two line simultaneous read-out type solid-state image sensor including two signal output terminals for outputting, as an image pick-up signal, image pick-up information obtained at the plurality of pixels to read out image pick-up information of all pixels every one field to output an image pick-up signal of odd line from the first signal output terminal and to output an image pick-up signal of even lines from the second signal output terminal; signal switching means for alternately carrying out switching between respective image pick-up signals outputted from the first and second signal output terminals of the solid-state image sensor every one field to output an image pick-up signal thus obtained; first process processing means for forming a television signal in conformity with the standard system from one image pick-up signal outputted through the signal switching means; and second process processing means for forming a television signal in conformity with the standard system from the other image pick-up signal outputted through the signal switching means to output, as standard television signals of 2 channels, respective image pick-up signals of fields different from each other which have been respectively read out from the solid-state image sensor.

Moreover, the solid-state image pick-up apparatus according to this invention further comprises: a first synchronizing generator for generating a first synchronizing signal corresponding to respective fields of one image pick-up signal outputted through the signal switching means; and a second synchronizing signal generator for generating a second synchronizing signal corresponding to respective fields of the other image pick-up signal outputted through the signal switching means, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the solid-state image pick-up apparatus according to this invention further comprises a synchronizing signal generator for generating a synchronizing signal corresponding to respective fields of one image pick-up signal outputted through the signal switching means, wherein the first and second process processing means carry out process processing on the basis of the synchronizing signal delivered from the synchronizing signal generator.

A solid-state image pick-up apparatus according to this invention comprises: a plurality of pixels arranged in a matrix form; a two line simultaneous read-out type solid-state image sensor including two signal output terminals for outputting, as an image pick-up signal, image pick-up information obtained at the plurality of pixels to read out image pick-up information of all pixels every field to output an image pick-up signal of odd line from the first signal output terminal and to output an image pick-up signal of even line from the second signal output terminal; first process processing means for forming a television signal from an image pick-up signal outputted through the first signal output terminal of the solid-state image sensor; and second process processing means for forming a television signal from an image pick-up signal outputted through the second signal output terminal of the solid-state image sensor, thus to output, as non-interlaced television signals of 2 channels, respective image pick-up signals of fields different from each other which have been respectively read out from the solid-state image sensor.

Moreover, the solid-state image pick-up apparatus according to this invention further comprises: a first synchronizing signal generator for generating a first synchronizing signal corresponding to field of an image pick-up signal outputted through the first signal output terminal of the solid-state image sensor; and a second synchronizing signal generator for generating a second synchronizing signal corresponding to field of an image pick-up signal outputted through the second signal output terminal of the solid-state image sensor, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the solid-state image pick-up apparatus according to this invention further comprises: a synchronizing signal generator for generating a synchronizing signal corresponding to respective fields of an image pick-up signal outputted through the first signal output terminal of the solid-state image sensor, wherein the first and second process processing means carry out process processing on the basis of the synchronizing signal delivered from the synchronizing signal generator.

Further, an imaging system according to this invention comprises: a solid-state image pick-up unit having a plurality of pixels arranged in a matrix form, and a two line simultaneous read-out type solid-state image sensor including two signal output terminals for outputting, as an image pick-up signal, image pick-up information obtained at the plurality of pixels and adapted so that image pick-up information of all pixels are read out every field, the solid-state image pick-up unit being operative to image an object on a carrying path by the solid-state image sensor to output image pick-up signals of 2 channels of fields different from each other which have been respectively read out from the solid-state image sensor; and a picture processing unit including first and second field memory sections for respectively storing, as picture data, image pick-up signals of 2 channels delivered from the solid-state image pick-up unit and a picture processing section for generating picture data of one frame from picture data of fields different from each other stored in the first and second field memory sections to carry out picture processing.

Moreover, the imaging system according to this invention is adapted so that the solid-state image sensor reads out image pick-up information of all pixels every field to alternately output, with the relationship of phases opposite to each other, an image pick-up signal of odd line and an image pick-up signal of even line from two signal output terminals, the imaging system further comprising first process processing means for forming a television signal in conformity with the standard system from an image pick-up signal outputted through one signal output terminal of the solid-state image sensor; and second process processing means for forming a television signal in conformity with the standard system from an image pick-up signal outputted through the other signal output terminal of the solid-state image sensor, thus to output, as standard television signals of 2 channels, respective image pick-up signals of fields from each other which have been read out at the same time by 2 lines from the solid-state image sensor.

Further, the imaging system according to this invention further comprises: a first synchronizing signal generator for generating a first synchronizing signal corresponding to respective fields of an image pick-up signal outputted through one signal output terminal of the solid-state image sensor; and a second synchronizing signal generator for generating a second synchronizing signal corresponding to respective fields of an image pick-up signal outputted through the other signal output terminal of the solid-state image sensor, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the imaging system according to this invention further comprises a synchronizing signal generator for generating a synchronizing signal corresponding to respective fields of an image pick-up signal outputted through one signal output terminal of the solid-state image sensor, wherein the first and second process processing means carry out process processing on the basis of the synchronizing signal delivered from the synchronizing signal generator.

Further, an imaging system according to this invention is adapted so that the solid-state image sensor reads out image pick-up information of all pixels every one field to output an image pick-up signal of odd line from the first signal output terminal, and to output an image pick-up signal of even line from the second signal output terminal, the imaging system further comprising: signal switching means for alternately carrying out, every field, switching between respective image pick-up signals outputted from the first and second signal output terminals of the solid-state image sensor to output an image pick-up signal thus obtained; first process processing means for forming a television signal in conformity with the standard system from one image pick-up signal outputted through the signal switching means; and second process processing means for forming a television signal in conformity with the standard system from the other image pick-up signal outputted through the signal switching means thus to output, as standard television signals of 2 channels, respective image pick-up signals of fields different from each other which have been simultaneously read out by two lines from the solid-state image sensor.

Further, the imaging system according to this invention further comprises: a first synchronizing signal generator for generating a first synchronizing signal corresponding to respective fields of one image pick-up signal outputted through the signal switching means; and a second synchronizing signal generator for generating a second synchronizing signal corresponding to respective fields of the other image pick-up signal outputted through the signal switching means, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the imaging system according to this invention further comprises: a synchronizing signal generator for generating a synchronizing signal corresponding to respective fields of one image pick-up signal outputted through the signal switching means, wherein the first and second process processing means carry out process processing on the basis of the synchronizing signal delivered from the synchronizing signal generator.

Further, the imaging system according to this invention is adapted so that the solid-state image sensor reads out image pick-up information of all pixels every field to output an image pick-up signal of odd line from the first signal output terminal, and to output an image pick-up signal of even line from the second signal output terminal, the imaging system further comprising: first process processing means for forming a television signal from an image pick-up signal outputted through the first signal output terminal of the solid-state image sensor; and second process processing means for forming a television signal from an image pick-up signal outputted through the second signal output terminal of the solid-state image sensor, thus to output, as non-interlaced television signals of 2 channels, respective image pick-up signals of fields different from each other which have been simultaneously read out by two lines from the solid-state image sensor.

In addition, the imaging system according to this invention further comprises: a first synchronizing signal generator for generating a first synchronizing signal corresponding to field of an image pick-up signal outputted through the first signal output terminal of the solid-state image sensor; and a second synchronizing signal generator for generating a second synchronizing signal corresponding to field of an image pick-up signal outputted through the second signal output terminal of the solid-state image sensor, wherein the first process processing means carries out process processing on the basis of the first synchronizing signal delivered from the first synchronizing signal generator, and the second process processing means carries out process processing on the basis of the second synchronizing signal delivered from the second synchronizing signal generator.

Alternatively, the imaging system according to this invention further comprises: a synchronizing signal generator for generating a synchronizing signal corresponding to respective fields of an image pick-up signal outputted through the first signal output terminal of the solid-state image sensor, wherein the first and second process processing means carry out process processing on the basis of the synchronizing signal delivered from the synchronizing signal generator.

BEST MODE FOR CARRYING OUT THE INVENTION

Preferred embodiments of a solid-state image pick-up apparatus according to this invention will now be described with reference to the attached drawings.

Figure 1:
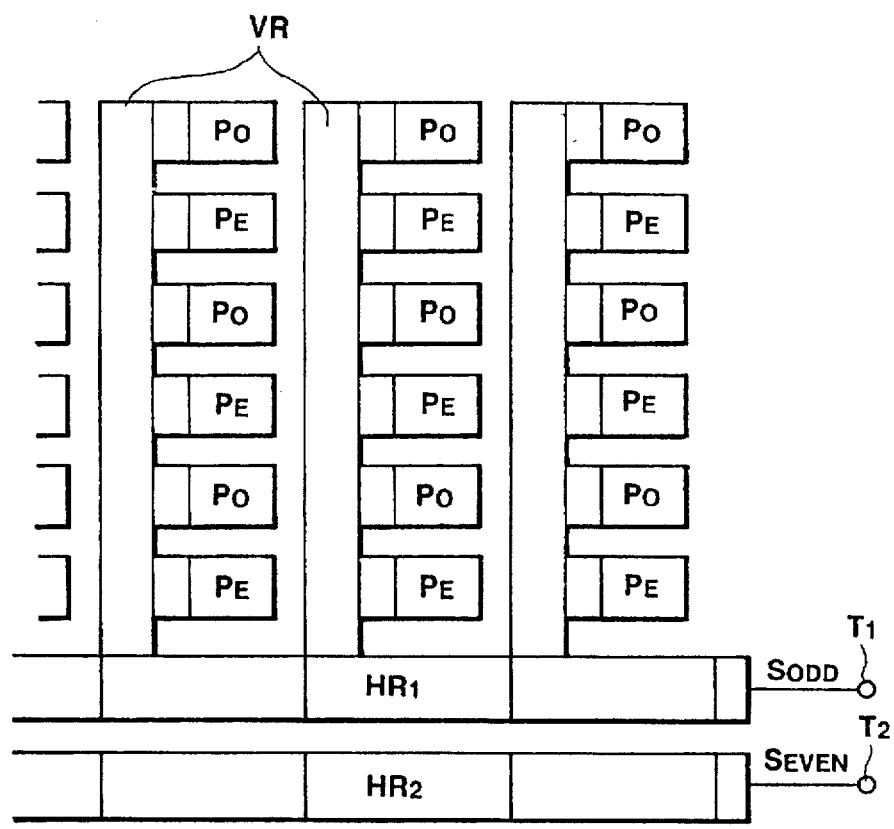
FIG. 1 is a model view for explaining the structure of 2 line simultaneous read-out type CCD image sensor.
Figure 2:
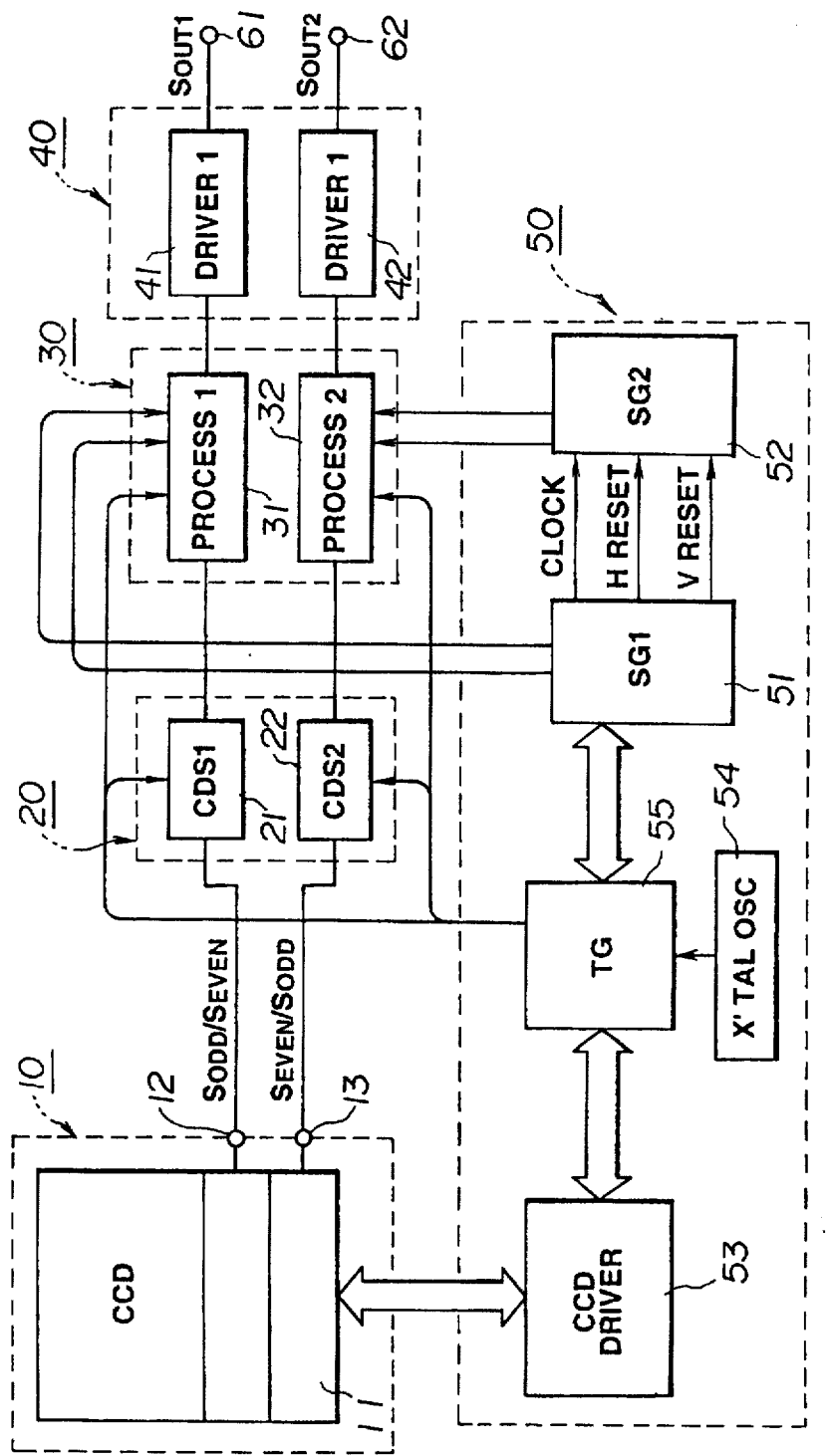
FIG. 2 is a block diagram showing the configuration of a first embodiment of a solid-state image pick-up apparatus according to this invention.

The solid-state image pick-up apparatus according to this invention is constituted as in the first embodiment shown in FIG. 2, for example.

The solid-state image pick-up apparatus of the first embodiment shown in FIG. 2 comprises an imaging section 10 comprised of 2 line simultaneous read-out type CCD image sensor 11, a correlative double sampling processing section 20 composed of first and second correlative double sampling circuits 21, 22, a process processing section 30 composed of first and second process processing circuits 31, 32, a signal output section 40 composed of first and second output amplifiers 41, 42, and a drive control section 50 composed of first and second synchronizing signal generators 51, 52, a CCD drive circuit 53, a crystal oscillator 54 and a timing generator 55, etc., whereby an approach is employed to drive and control, by the drive control section 50, the imaging section 10, the correlative double sampling processing section 20 and the process processing section 30 to thereby form standard television signals $S_{OUT1}$, $S_{OUT2}$ of 2 channels formed by the process processing section 30 with respect to respective image pick-up signals $S_{ODD}$, $S_{EVEN}$ which have been simultaneously read out by 2 lines from CCD image sensor 11 of the imaging section 10 to output these standard television signals $S_{OUT1}$, $S_{OUT2}$ of 2 channels from first and second output terminals 61, 62 through the signal output section 40.

In the solid-state image pick-up apparatus of the first embodiment, CCD drive circuit 53 of the drive control section 50 forms various CCD drive pulses such as signal charge read-out pulse, horizontal transfer pulse, vertical transfer pulse, electronic shutter pulse, etc. on the basis of timing pulse for CCD drive delivered from timing generator 55 to deliver these CCD drive pulses to CCD image sensor 11 of the imaging section 10.

Figure 3:
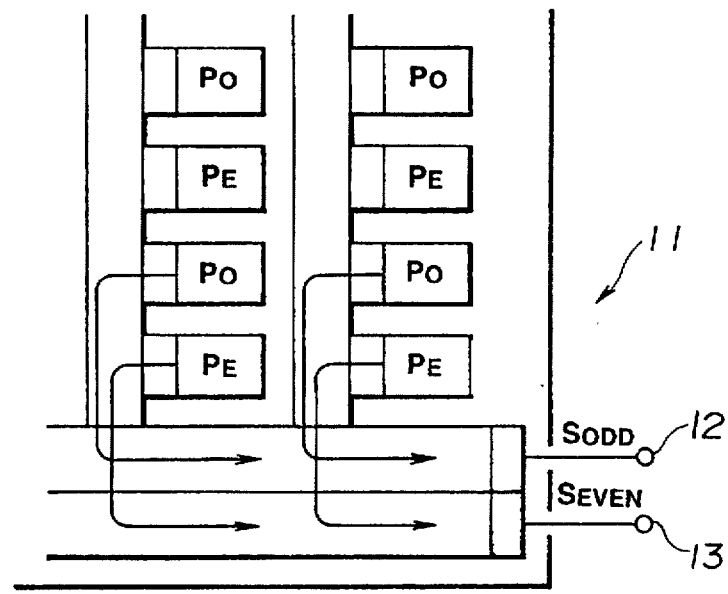
FIG. 3 is a view for explaining image pick-up information included in image pick-up signal outputted in the odd field from 2 line simultaneous read-out type CCD image sensor of imaging section in the above-mentioned first embodiment.
Figure 4:
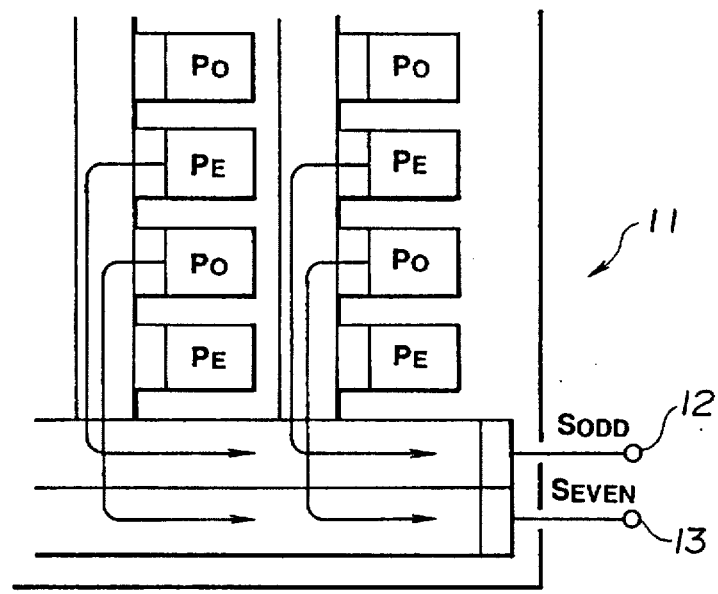
FIG. 4 is a view for explaining image pick-up information included in image pick-up signal outputted in the even field from the 2 line simultaneous read-out type CCD image sensor of imaging section in the above-mentioned first embodiment.
Figure 5:
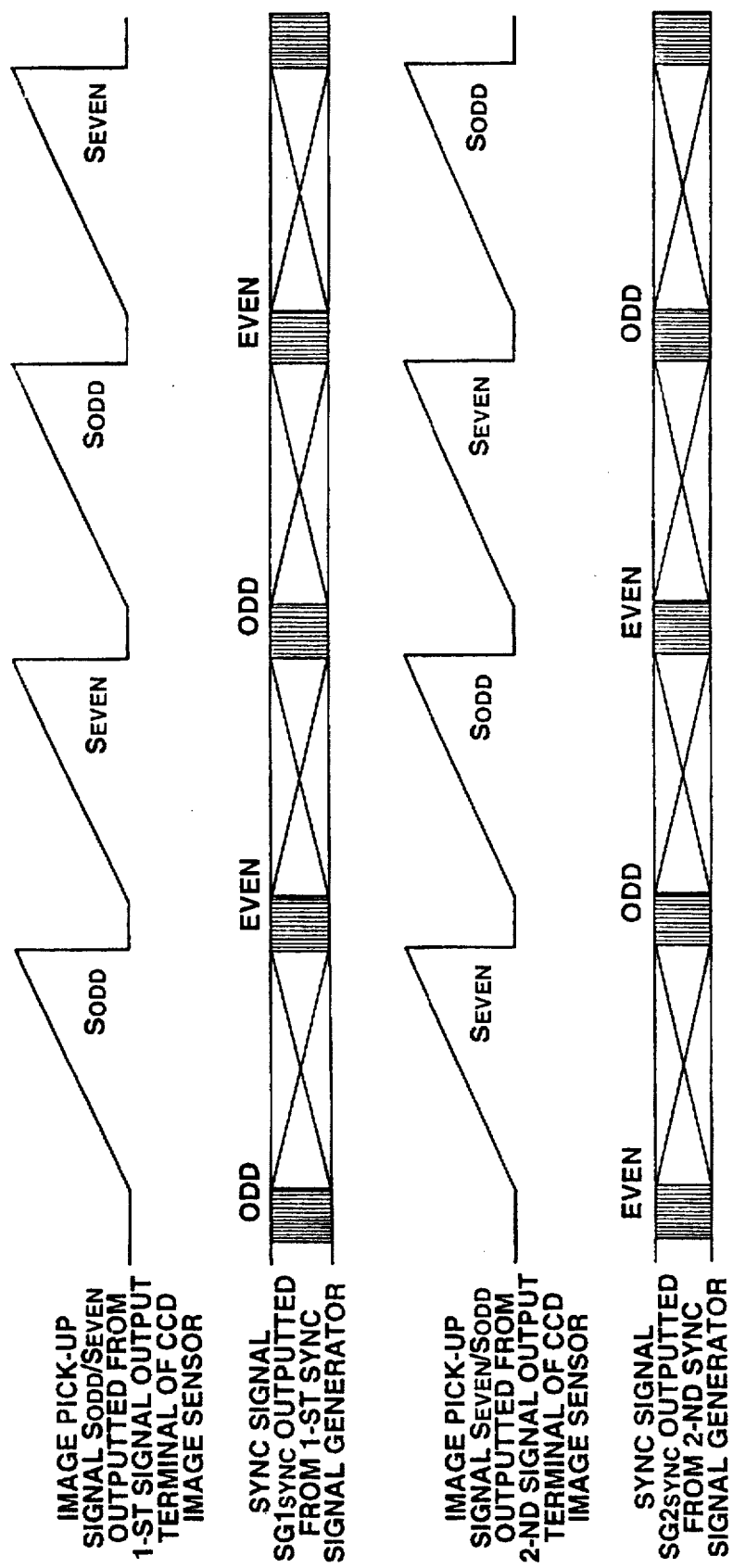
FIG. 5 is a timing chart showing the relationship between image pick-up signals $S_{ODD}/S_{EVEN}$, $S_{EVEN}/S_{ODD}$ and synchronizing signals $SG1_{SYNC}$, $SG2_{SYNC}$ delivered to process processing section in the above-mentioned first embodiment.

The 2 line simultaneous read-out type CCD image sensor 11 constituting the imaging section 10 is driven by the CCD drive circuit 53, and is operative in the odd field as shown in FIG. 3 to output, as image pick-up signal $S_{ODD}$, respective image pick-up information obtained by light receiving sections $P_0$ of odd lines from first output terminal 12, and to output, as image pick-up signal $S_{EVEN}$, respective image pick-up information obtained by light receiving sections $P_E$ of even lines from second output terminal 13. Moreover, as shown in FIG. 4, in the even field, the CCD image sensor 11 is operative to sweep away image pick-up information of the first 1 line obtained by light receiving section $P_O$ of even line thereafter to carry out 2 line simultaneous read-out operation to thereby output, as image pick-up signal $S_{EVEN}$, respective image pick-up information obtained by light receiving sections $P_E$ of even lines from first output terminal 12, and to output, as image pick-up signal $S_{ODD}$, respective image pick-up information obtained by light receiving sections $P_O$ of odd lines from second output terminal 13. Namely, as shown in FIG. 5, the CCD image sensor 11 reads out all pixel information every field to alternately output image pick-up signal $S_{ODD}$ of odd line and image pick-up signal $S_{EVEN}$ of even line from first and second signal output terminals 12, 13.

Image pick-up signals $S_{ODD}/S_{EVEN}$ alternately outputted every field from first signal output terminal 12 of the CCD image sensor 11 are delivered to first correlative double sampling circuit 21 of the correlative double sampling processing section 20, and image pick-up signals $S_{EVEN}/S_{ODD}$ alternately outputted every field from second signal output terminal 13 of the CCD image sensor 11 are delivered to second correlative double sampling circuit 21 of the correlative double sampling processing section 20.

The correlative double sampling processing section 20 is operative to carry out processing to respectively clamp, with respect to respective image pick-up signals $S_{ODD}/S_{EVEN}$, $S_{EVEN}/S_{ODD}$ which have been simultaneously read out by two lines through the first and second signal output terminals 12, 13 from the CCD image sensor 11, on the basis of sample hold pulse delivered from timing generator 55 of the drive control section 50, reset noise levels by the first and second correlative double sampling circuits 21, 22 to sample and hold output levels with the clamped reset noise level being as reference to thereby reduce reset noise. The image pick-up signals $S_{ODD}/S_{EVEN}$ in which reset noise has been reduced by the first correlative double sampling circuit 21 are delivered to first process processing circuit 31 of the process processing section 30, and image pick-up signals $S_{EVEN}/S_{ODD}$ in which reset noise has been reduced by the second correlative double sampling circuit 22 are delivered to second process processing circuit 32 of the process processing section 30.

The process processing section 30 serves to carry out signal processing for forming standard television signals of 2 channels from respective image pick-up signals $S_{ODD}/S_{EVEN}$, $S_{EVEN}/S_{ODD}$ in which reset noise has been reduced by the correlative double sampling processing section 20. Namely, first process processing circuit 31 of the process processing section 30 implements, with respect to image pick-up signals $S_{ODD}/S_{EVEN}$ in which reset noise has been reduced by the first correlative double sampling circuit 21, on the basis of blanking pulse and/or synchronizing signal delivered from first synchronizing signal generator 51 of the drive control section 50, signal processing such as gain up, pedestal set, white clip, blanking cleaning and addition of synchronizing signal, etc. to thereby form television signal $S_{OUT1}$ in conformity with the standard system (e.g., NTSC system). Moreover, second process processing circuit 32 implements, with respect to image pick-up signals $S_{EVEN}/S_{ODD}$ in which reset noise has been reduced by the second correlative double sampling circuit 21, on the basis of blanking pulse and/or synchronizing signal delivered from second synchronizing signal generator 52 of the drive control section 50, signal processing such as gain up, pedestal set, white clip, blanking cleaning, and addition of synchronizing signal, etc. to thereby form television signal $S_{OUT2}$ in conformity with the standard system (e.g., NTSC system).

Figure 6:
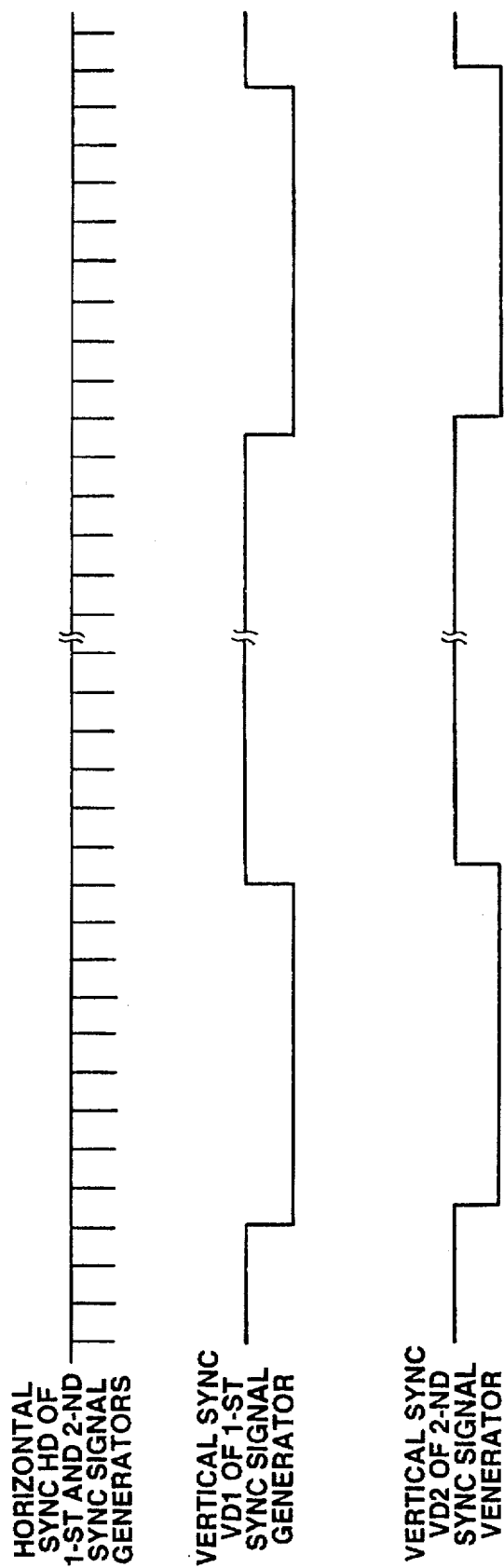
FIG. 6 is a timing chart showing the operation of first and second synchronizing signal generators of drive control section in the above-mentioned first embodiment.

Here, first and second synchronizing signal generators 51, 52 of the drive control section 50 become operative by common system clock given by the timing generator 55, and are operative as shown in FIG. 6 at the timing where timings of horizontal synchronization HD are the same and timings of vertical synchronization VD are shifted by H/2. These generators 51, 52 respectively deliver blanking pulse and synchronizing signal to first and second process processing circuits 31, 32 of the process processing section 30.

Then, in the process processing section 30, standard television signals $S_{OUT1}$, $S_{OUT2}$ of 2 channels formed from respective image pick-up signals $S_{ODD}/S_{EVEN}$, $S_{EVEN}/S_{ODD}$ are outputted from first and second output terminals 61, 62 through first and second output amplifiers 41, 42 of the signal output section 40.

In this example, first and second output amplifiers 41, 42 of the signal output section 40 have output impedance of 75 ohms matching with the characteristic impedance of transmission cables respectively connected to the output terminals 61, 62.

In the solid-state image pick-up apparatus of the first embodiment thus constituted, since there is employed an approach to form, from image pick-up signal $S_{ODD}$ of odd line and image pick-up signal $S_{EVEN}$ of even line alternately outputted every field through two signal output terminals 12, 13 of the 2 line simultaneous read-out type solid-state image sensor 11, standard television signals $S_{OUT1}$, $S_{OUT2}$ of 2 channels by first and second process processing circuits 31, 32 to output the standard television signals $S_{OUT1}$, $S_{OUT2}$ of 2 channels from output terminals 61, 62, it is possible to output all pixel information of the solid-state image sensor 11 every field.

Figure 7:
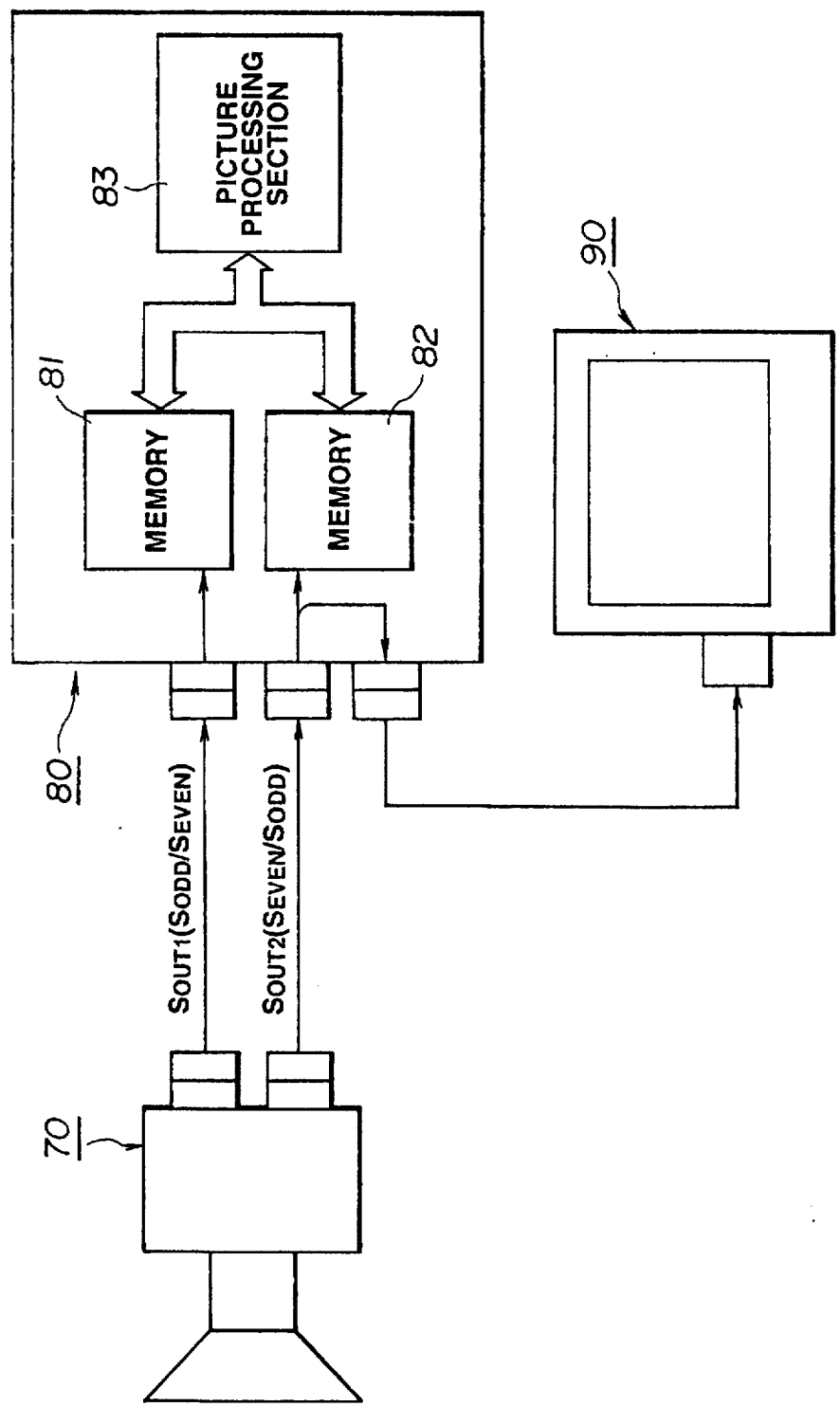
FIG. 7 is a block diagram showing the configuration of an imaging system using the solid-state image pick-up apparatus according to this invention.

Accordingly, as shown in FIG. 7, for example, in an imaging system in which picture processing unit 80 is connected to the solid-state image pick-up unit (apparatus) 70 according to this invention, the standard television signals $S_{OUT1}$, $S_{OUT2}$ of 2 channels are taken into field memory sections 81, 82 every field, thus making it possible to carry out picture processing using all pixel information of the solid-state image sensor 11 by picture processing section 83. Moreover, since image pick-up output signals $S_{OUT1}$, $S_{OUT2}$ of 2 channels outputted from the output terminals 61, 62 are respectively television signals in conformity with the standard system, one side channel is utilized, thereby making it possible to conduct monitoring by monitor unit 90. This is convenient in determination of picture angle (angle of view) of picture and/or positioning thereof.

The imaging system shown in FIG. 7 serves to image (image-pick up) object 101 transferred (conveyed) on carrying path 100 by the solid-state image pick-up unit 70 to carry out picture processing by picture processing unit 80 with respect to that image pick-up output. In more practical sense, object sensor 110 for detecting passing of object 101 is provided at the upstream side of the carrying path 100 to drive, by synchronization control unit 111 supplied with detection signal of the object sensor 110, strobe emitting unit 112 at the timing where the object 101 falls within the image pick-up range of the solid-state image pick-up unit 70, thus to strobe-image the object 101. Further, memory control signal $R/W_{CTL}$ is delivered from the synchronization control unit to the picture processing unit 80 to take the standard television signals $S_{OUT1}$, $S_{OUT2}$ of 2 channels into field memory sections 81, 82. Further, picture data of one frame using all pixel information of the solid-state image sensor 11 is generated by the picture processing section 83 thus to carry out picture processing.

Figure 8:
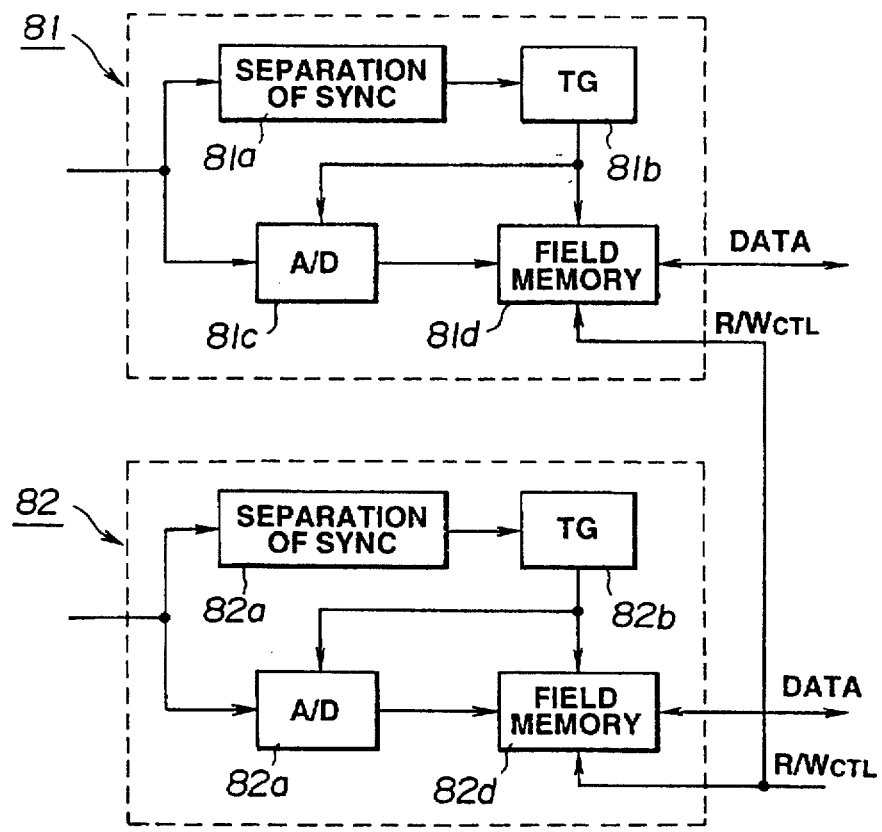
FIG. 8 is a block diagram showing an example of an actual configuration of respective field memory sections of picture processing unit in the above-mentioned imaging system.

Here, field memory section 81 in the above-mentioned picture processing unit 80 comprises, as shown in FIG. 8, for example, synchronization separating circuit 81a for separating synchronizing signal added to standard television signal $S_{OUT1}$ delivered from the solid-state image pick-up unit 70, timing generator 81b for generating timing pulses synchronous with synchronizing signal obtained by the synchronization separating circuit 81a, A/D converter 81c for digitizing the standard television signal $S_{OUT1}$ in accordance with timing pulse delivered from the timing generator 81b, and field memory 81d into which standard television signal $S_{OUT1}$ digitized by the A/D converter 81c is written, whereby write processing synchronous with synchronizing signal added to the standard television signal $S_{OUT1}$ is carried out. Similarly, field memory section 82 in the picture processing unit 80 comprises synchronization separating circuit 82a for separating synchronizing signal added to standard television signal $S_{OUT2}$ delivered from the solid-state image pick-up unit 70, timing generator 82b for generating timing pulse synchronous with synchronizing signal obtained by the synchronization separating circuit 82a, A/D converter 82c for digitizing the standard television signal $S_{OUT2}$ in accordance with timing pulse delivered from the timing generator 82b, and field memory 82d into which standard television signal $S_{OUT2}$ digitized by the A/D converter 82c is written, whereby write processing synchronous with synchronizing signal added to the standard television signal $S_{OUT2}$ is carried out.

Figure 9:
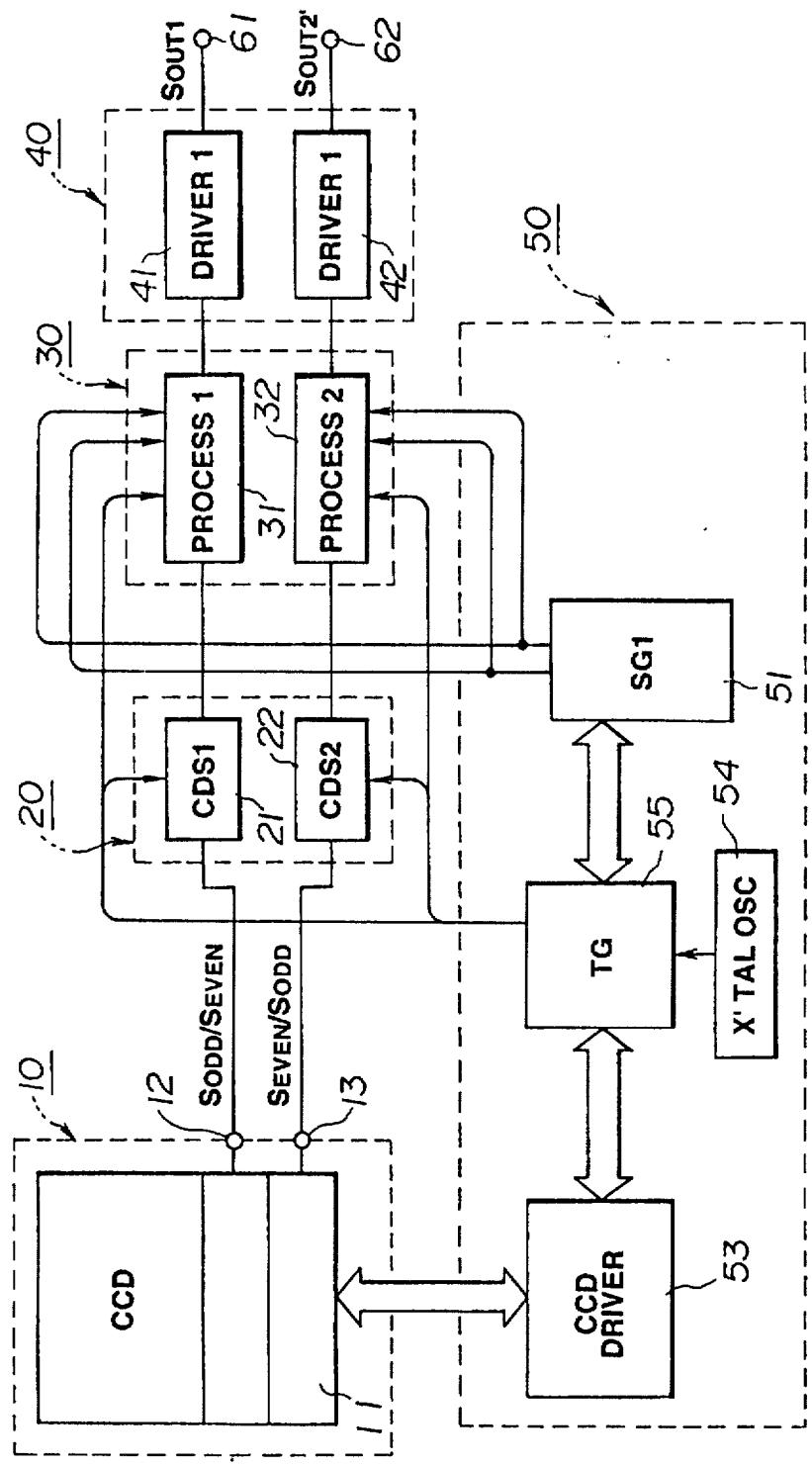
FIG. 9 is a block diagram showing the configuration of a second embodiment of a solid-state image pick-up apparatus according to this invention.

Moreover, a solid-state image pick-up apparatus according to this invention is constituted as in the second embodiment of FIG. 9, for example.

The solid-state image pick-up apparatus of the second embodiment shown in FIG. 9 is modification of the above-described first embodiment, wherein blanking pulse and/or synchronizing signal are delivered from first synchronizing signal generator 51 of drive control section 50 to first and second process processing circuits 31, 32 of process processing section 30 in the above-described first embodiment so that second synchronizing signal generator 52 of the drive control section 50 is omitted.

It is to be noted that, in the solid-state image pick-up apparatus of the second embodiment, the same reference numerals are respectively attached to the same components as those of the first embodiment in FIG. 9, and their detailed explanation is omitted.

Figure 10:
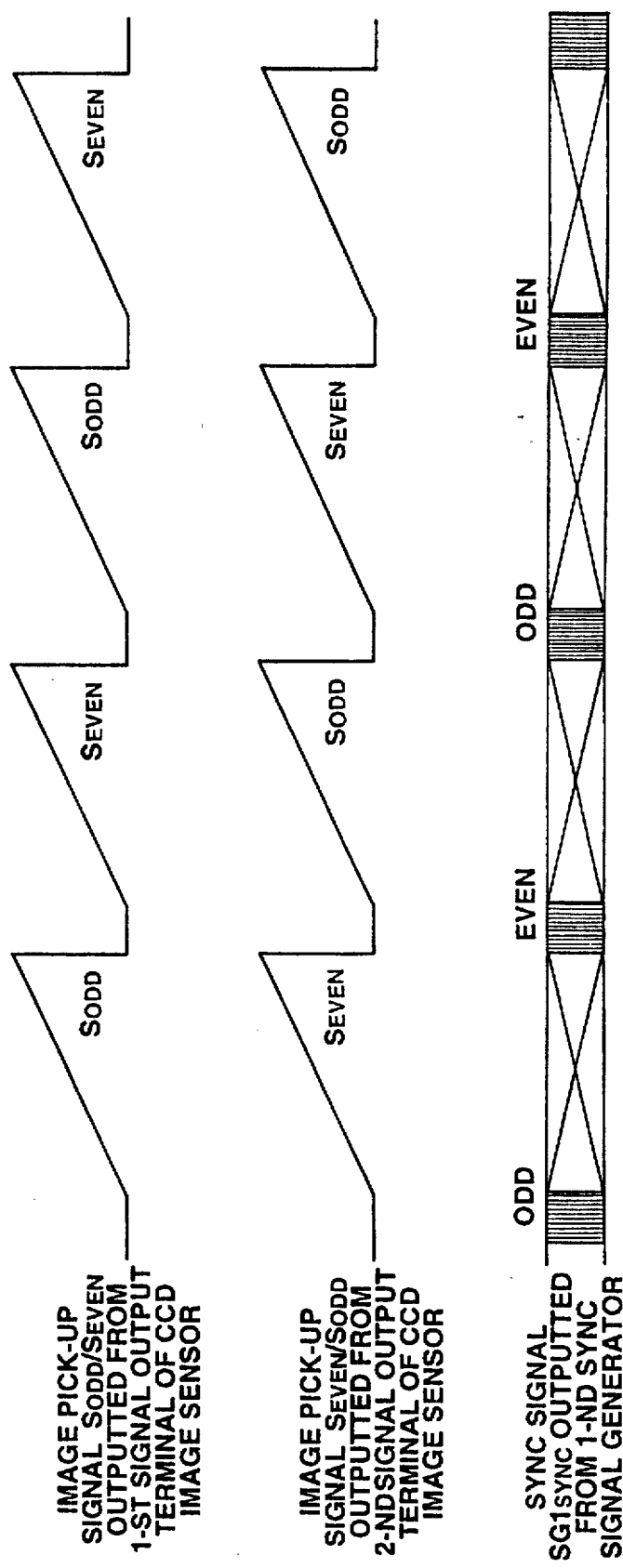
FIG. 10 is a timing chart showing the relationship between image pick-up signals $S_{ODD}/S_{EVEN}$, $S_{EVEN}/S_{ODD}$ and synchronizing signal $SG1_{SYNC}$ delivered to process processing section in the above-mentioned second embodiment.

In this solid-state image pick-up apparatus, first and second process processing circuits 31, 32 of process processing section 30 carry out, as shown in FIG. 10, with respect to respective image pick-up signals $S_{ODD}/S_{EVEN}$, $S_{EVEN}/S_{ODD}$ outputted from two signal output terminals 12, 13 of 2 line simultaneous read-out type solid-state image sensor 11 of imaging section 10, process processing synchronous with synchronizing signal given by first synchronizing signal generator 51.

Namely, first process processing circuit 31 of the process processing section 30 implements, with respect to image pick-up signals $S_{ODD}/S_{EVEN}$ in which reset noise has been reduced by first correlative double sampling circuit 21, on the basis of blanking pulse and/or synchronizing signal delivered from first synchronizing signal generator 51 of the drive control section 50, signal processing such as gain up, pedestal set, white clip, blanking cleaning and addition of synchronizing signal, etc. to thereby form television signal $S_{OUT1}$ in conformity with, e.g., the NTSC system.

Moreover, second process processing circuit 31 of the process processing section 30 implements, with respect to image pick-up signals $S_{EVEN}/S_{ODD}$ in which reset noise has been reduced by second correlative double sampling circuit 21, on the basis of blanking pulse and/or synchronizing signal delivered from first synchronizing signal generator 51 of the drive control section 50, signal processing such as gain up, pedestal set, white clip, blanking cleaning and addition of synchronizing signal, etc. to thereby form television signal $S_{OUT2}$, in the state where the relationship between synchronizing signal and field in, e.g., the NTSC system is judged.

The television signals $S_{OUT1}$, $S_{OUT2}$, of 2 channels formed from respective image pick-up signals $S_{ODD}/S_{EVEN}$, $S_{EVEN}/S_{ODD}$ in the process processing section 30 in this way are outputted from first and second output terminals 61, 62 through first and second output amplifiers 41, 42 of signal output section 40.

Also in the solid-state image pick-up apparatus of the second embodiment thus constituted, since an approach is employed to form television signals $S_{OUT1}$, $S_{OUT2}$, of 2 channels by first and second process processing circuits 31, 32 from image pick-up signal $S_{ODD}$ of odd line and image pick-up signal $S_{EVEN}$ of even line alternately outputted every field through two signal output terminals 12, 13 of 2 line simultaneous read-out type solid-state image sensor 11 to output these television signals $S_{OUT1}$, $S_{OUT2}$, of 2 channels from output terminals 61, 62, it is possible to output all pixel information of the solid-state image sensor 11 every field.

It should be noted that in the case where television signals $S_{OUT1}$, $S_{OUT2}$, of 2 channels obtained by the solid-state image pick-up apparatus of the second embodiment are caused to undergo picture processing by picture processing unit 80 in the above-described imaging system shown in FIG. 7, since common synchronizing signal is added to the television signals $S_{OUT1}$, $S_{OUT2}$, of 2 channels, respective field memory sections 81, 82 in the picture processing unit 80 can commonly use control circuit thereof.

Figure 11:
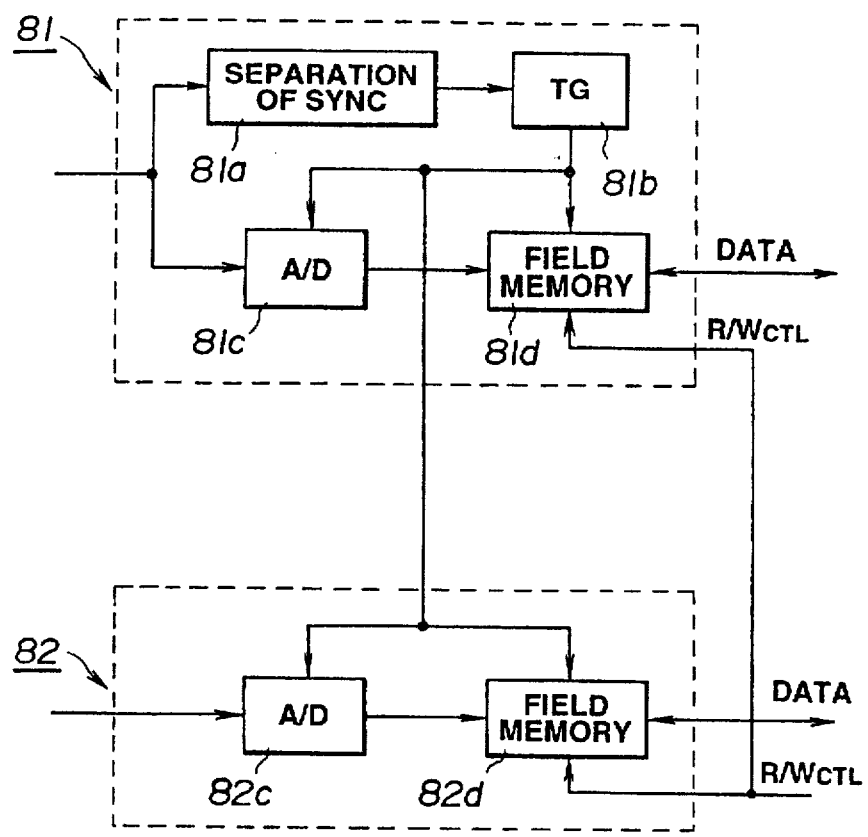
FIG. 11 is a block diagram showing an example of an actual configuration of respective field memory sections of picture processing unit in the above-mentioned imaging system.

Namely, as shown in FIG. 11, for example, field memory section 81 comprises synchronization separating circuit 81a for separating synchronizing signal added to standard television signal $S_{OUT1}$, timing generator 81b for generating timing pulse synchronous with synchronizing signal obtained by the synchronization separating circuit 81a, A/D converter 81c for digitizing the standard television signal $S_{OUT1}$ in accordance with timing pulse delivered from the timing generator 81b, and field memory 81d into which standard television signal $S_{OUT1}$ digitized by the A/D converter 81c is written. Moreover, field memory section 82 comprises A/D converter 82c for digitizing the television signal $S_{OUT2}$ and field memory 82d into which standard television signal $S_{OUT2}$ digitized by the A/D converter 82c is written. Thus, it is possible to carry out write processing synchronous with synchronizing signal added to the television signal $S_{OUT1}$ by respective field memory sections 81, 82.

Figure 12:
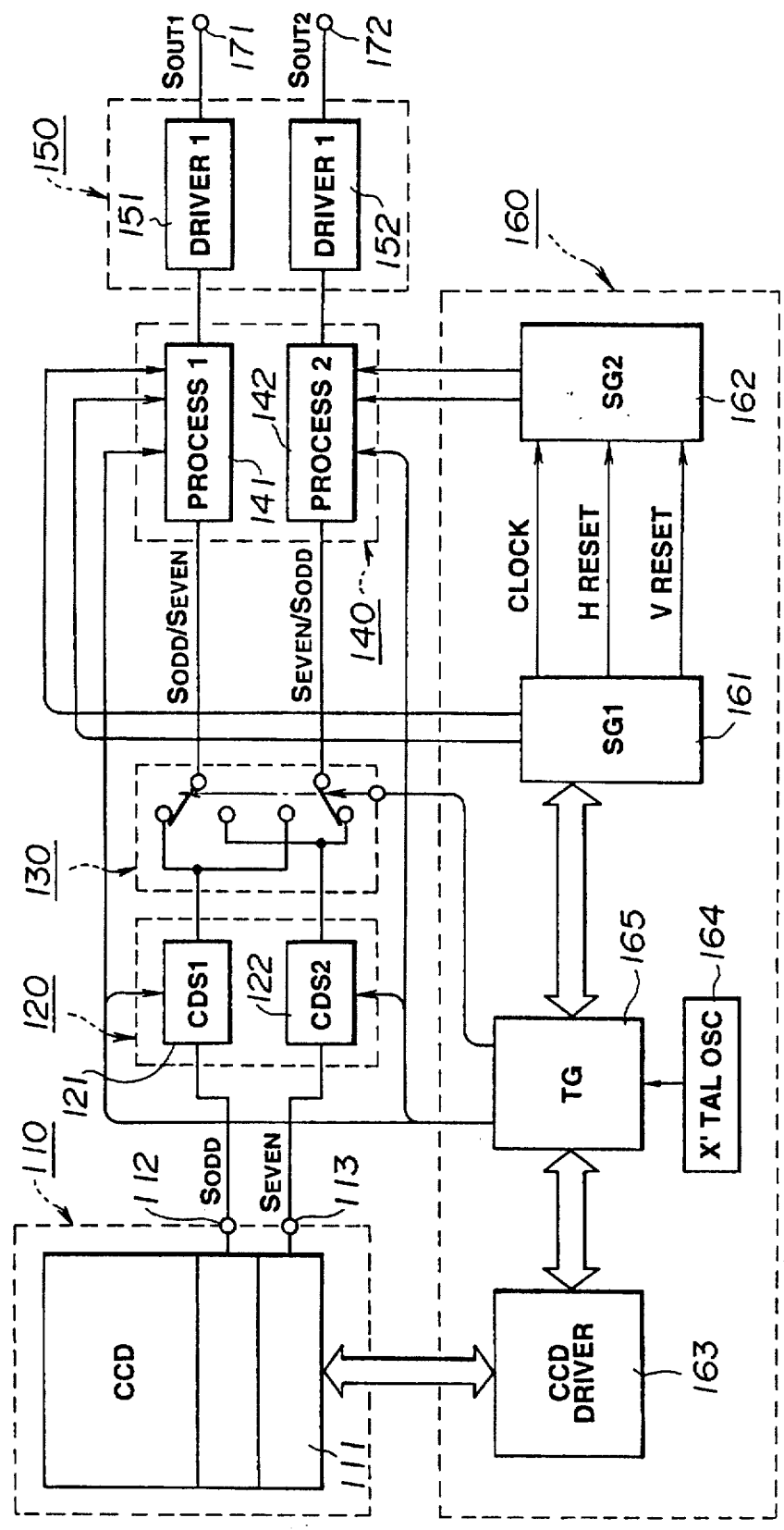
FIG. 12 is a block diagram showing the configuration of a third embodiment of a solid-state image pick-up apparatus according to this invention.

Moreover, a solid-state image pick-up apparatus according to this invention is constituted as in the third embodiment shown in FIG. 12, for example.

The solid-state image pick-up apparatus of the third embodiment shown in FIG. 12 comprises imaging section 110 comprised of 2 line simultaneous read-out type CCD image sensor 111, correlative double sampling processing section 120 composed of first and second correlative double sampling circuits 121, 122, signal switching section 130, process processing section 140 composed of first and second process processing circuits 141, 142, signal output section 150 composed of first and second output amplifiers 151, 152, and drive control section 160 including first and second synchronizing signal generators 161, 162, CCD drive circuit 163, crystal oscillator 164 and timing generator 165, etc. to drive and control the imaging section 110, the correlative double sampling processing section 120, the signal switching section 130 and the process processing section 140 by the drive control section 160 to thereby form, with respect to respective image pick-up signals $S_{ODD}$, $S_{EVEN}$ simultaneously read out by two lines from CCD image sensor 111 of the imaging section 110, standard television signals $S_{OUT1}$, $S_{OUT2}$ of 2 channels formed by the process processing section 140 to output these standard television signals $S_{OUT1}$, $S_{OUT2}$ of 2 channels from first and second output terminals 171, 172 through the signal output section 150.

In the solid-state image pick-up apparatus of the third embodiment, CCD drive circuit 163 of the drive control section 160 forms various CCD drive pulses such as signal charge read-out pulse, horizontal transfer pulse, vertical transfer pulse and electronic shutter pulse, etc. on the basis of timing pulses for CCD drive delivered from timing generator 165 to deliver these CCD drive pulses to CCD image sensor 111 of the imaging section 110.

Figure 13:
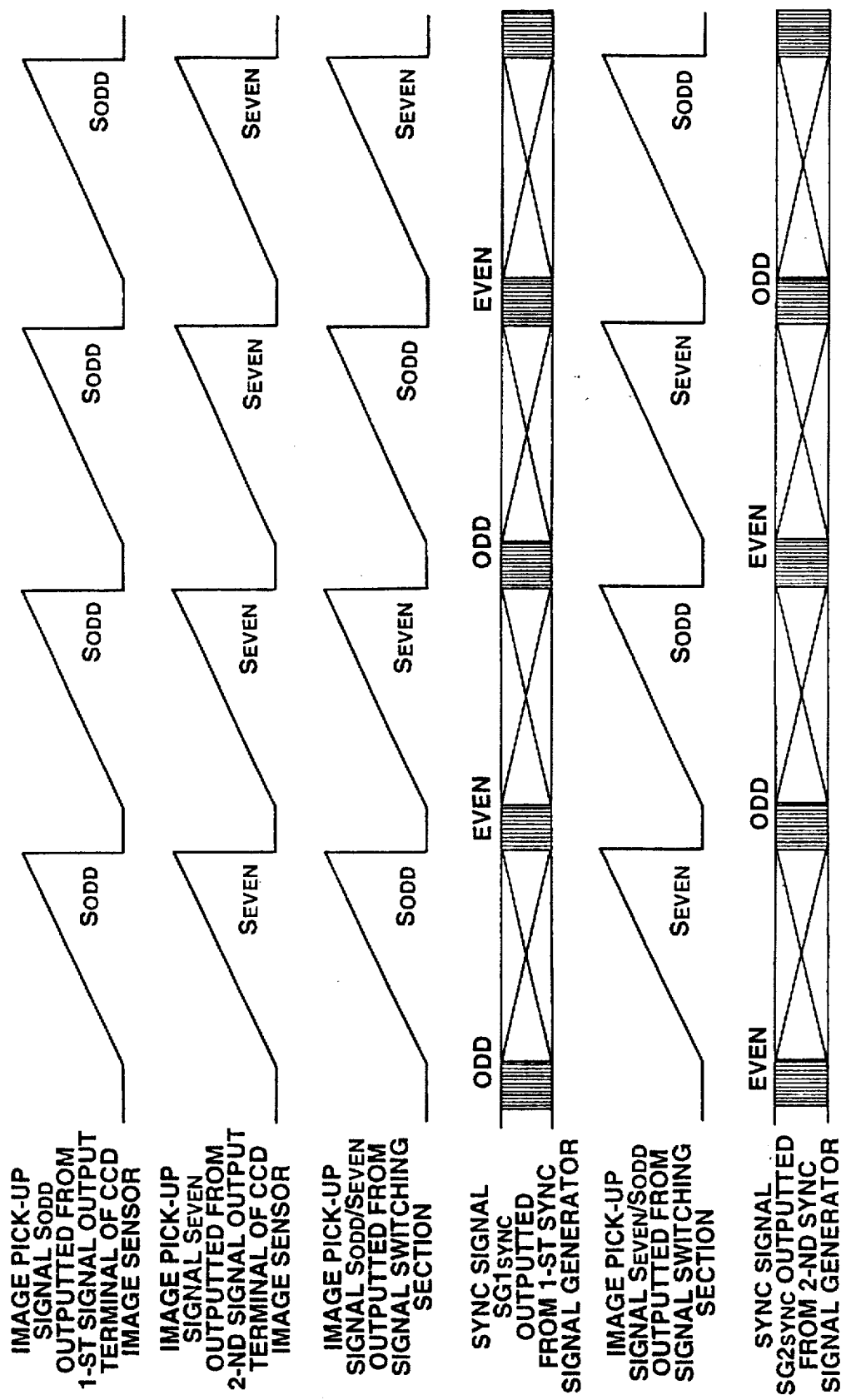
FIG. 13 is a timing chart showing the relationship between image pick-up signals $S_{ODD}/S_{EVEN}$, $S_{EVEN}/S_{ODD}$ and synchronizing signals $SG1_{SYNC}$, $SG2_{SYNC}$ delivered to process processing section in the above-mentioned third embodiment.

The two line simultaneous read-out type CCD image sensor 111 constituting the imaging section 110 is driven by the CCD drive circuit 163, and is operative as shown in FIG. 13 to read out all pixel information every field to output image pick-up signal $S_{ODD}$ of odd line from first signal output terminal 112, and to output image pick-up signal $S_{EVEN}$ of even line from second signal output terminal 113.

The image pick-up signal $S_{ODD}$ of odd line outputted from first signal output terminal 112 of the CCD image sensor 111 is delivered to first correlative double sampling circuit 121 of the correlative double sampling processing section 120, and the image pick-up signal $S_{EVEN}$ of even line outputted from second signal output terminal 113 of the CCD image sensor 111 is delivered to second correlative double sampling circuit 122 of the correlative double sampling processing section 120.

The correlative double sampling processing section 120 carries out, with respect to respective image pick-up signals $S_{ODD}$, $S_{EVEN}$ which have been simultaneously read out by two lines through the first and second signal output terminals 112, 113 from the CCD image sensor 111, on the basis of sample hold pulses delivered from timing generator 165 of the drive control section 160, processing to respectively clamp reset noise levels by the first and second correlative double sampling circuits 121, 122 to sample and hold the output level with the clamped reset noise levels being as reference to thereby reduce those reset noises. The image pick-up signal $S_{ODD}$ of odd line in which reset noise has been reduced by the first correlative double sampling circuit 121 and the image pick-up signal $S_{EVEN}$ of even line in which reset noise has been reduced by the second correlative double sampling circuit 122 are delivered to first process processing circuits 141, 142 of the process processing section 140 through the signal switching section 130.

The signal switching section 130 alternately carries out, every field, switching between image pick-up signal $S_{ODD}$ of odd line and image pick-up signal $S_{EVEN}$ of even line, as shown in FIG. 13, in accordance with switching control pulse delivered from timing generator 165 of the drive control section 160 to deliver the image pick-up signal thus obtained to first and second process processing circuits 141, 142 of the process processing section 140.

The process processing section 140 serves to carry out signal processing to form standard television signals of 2 channels from respective image pick-up signals $S_{ODD}$/$S_{EVEN}$, $S_{EVEN}$/$S_{ODD}$ alternately switched every field by the signal switching section 130. Namely, first process processing circuit 141 of the process processing section 140 implements, with respect to image pick-up signals $S_{ODD}$/$S_{EVEN}$ delivered through the signal switching section 130, on the basis of blanking pulse and/or synchronizing signal delivered from first synchronizing signal generator 161 of the drive control section 160, signal processing such as gain up, pedestal set, white clip, blanking cleaning and/or addition of synchronizing signal, etc. to thereby form television signal $S_{OUT1}$ in conformity with the standard system (e.g., NTSC system). Moreover, the second process processing circuit 142 implements, with respect to image pick-up signals $S_{EVEN}$/$S_{ODD}$ delivered through the signal switching section 130, on the basis of blanking pulse and/or synchronizing signal delivered from second synchronizing signal generator 162 of the drive control section 160, signal processing such as gain up, pedestal set, white clip, blanking cleaning and/or addition of synchronizing signal, etc. to thereby form television signal $S_{OUT2}$ in conformity with the standard system (e.g., NTSC system).

Here, first and second synchronizing signal generators 161, 162 of the drive control section 160 becomes operative by common system clock given by the timing generator 165, and are operative at timings where timings of horizontal synchronization HD are the same and timings of vertical synchronization VD are shifted by H/2. These signal generators 161, 162 respectively deliver blanking pulse and/or synchronizing signal to first and second process processing circuits 141, 142 of the process processing section 140.

In the process processing section 140, standard television signals $S_{OUT1}$, $S_{OUT2}$ of 2 channels formed from respective image pick-up signals $S_{ODD}$/$S_{EVEN}$, $S_{EVEN}$/$S_{ODD}$ are outputted from first and second output terminals 171, 172 through first and second output amplifiers 151, 152 of the signal output section 150.

In the solid-state image pick-up apparatus of the third embodiment, standard television signals $S_{OUT1}$, $S_{OUT2}$ of 2 channels similar to those of the solid-state image pick-up apparatus of the first embodiment are obtained. By picture processing unit 80 of the above-described imaging system shown in FIG. 7, it is possible to carry out picture processing using all pixel information of the solid-state image sensor 111.

Figure 14:
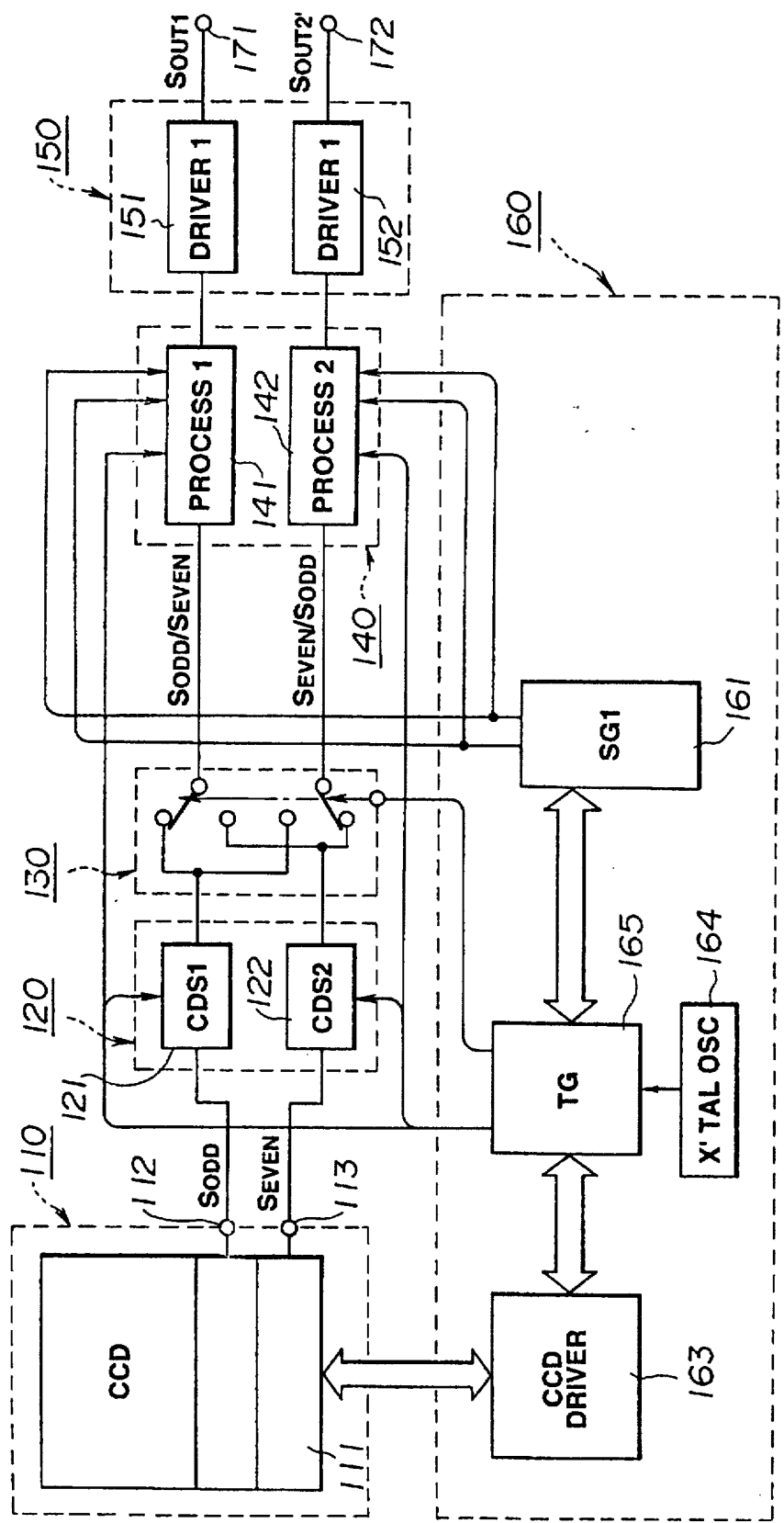
FIG. 14 is a block diagram showing the configuration of a fourth embodiment of a solid-state image pick-up apparatus according to this invention.

Moreover, a solid-state image pick-up apparatus according to this invention is constituted as in the fourth embodiment shown in FIG. 14, for example.

The solid-state image pick-up apparatus of the fourth embodiment shown in FIG. 14 is modification of the above-described third embodiment, wherein blanking pulse and/or synchronizing signal are delivered from first synchronizing signal generator 161 of drive control section 160 to first and second process processing circuits 141, 142 of the process processing section 140 of the above-described third embodiment so that second synchronizing signal generator 162 of the drive control section 160 is omitted.

It is to be noted that, in the solid-state image pick-up apparatus of the fourth embodiment, the same reference numerals are respectively attached to the same components as those of the third embodiment in FIG. 14 and their detailed explanation is omitted.

Figure 15:
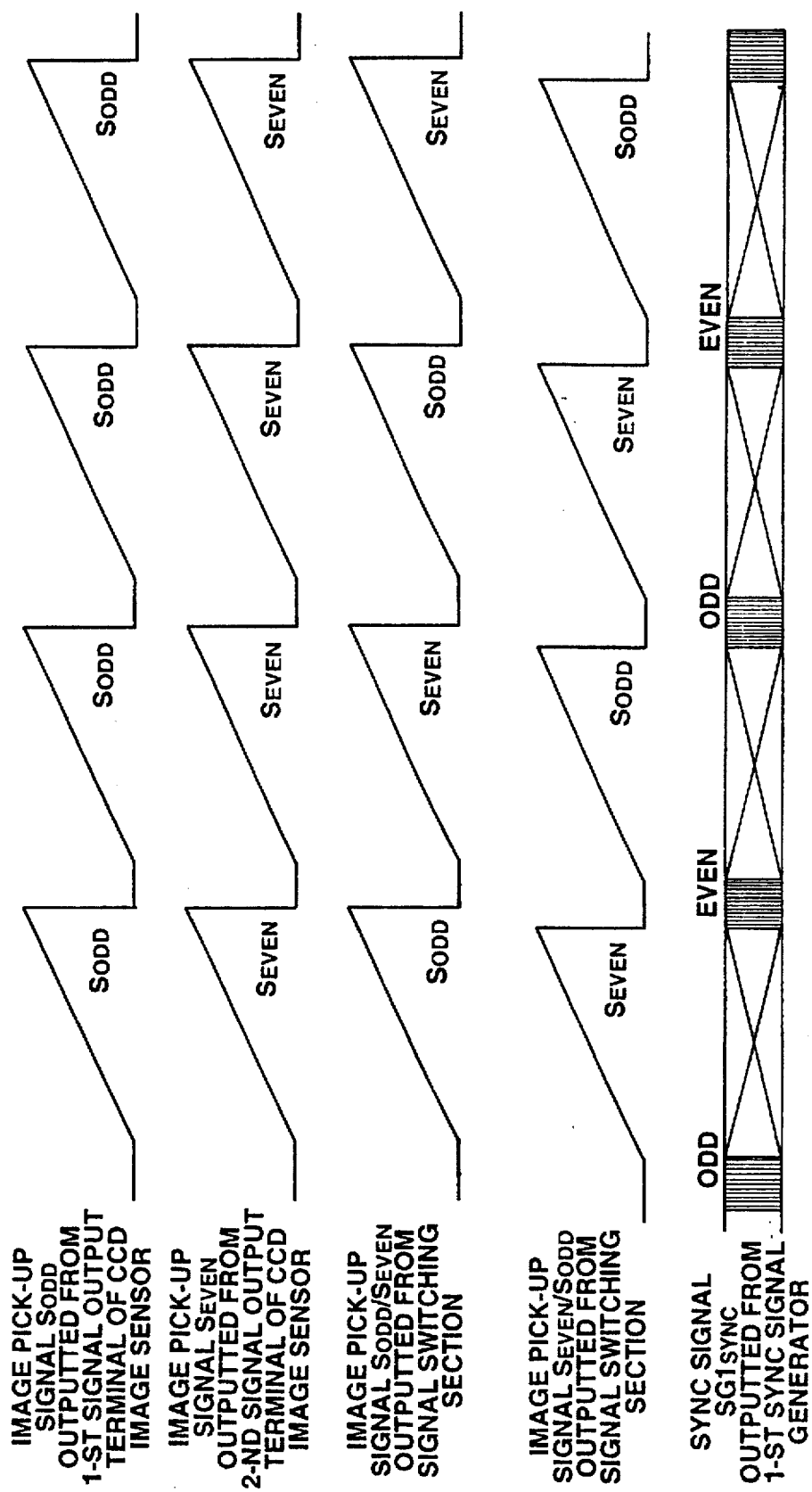
FIG. 15 is a timing chart showing the relationship between image pick-up signals $S_{ODD}/S_{EVEN}$, $S_{EVEN}/S_{ODD}$ and synchronizing signal $SG1_{SYNC}$ delivered to process processing section in the above-mentioned fourth embodiment.

In this solid-state image pick-up apparatus, first and second process processing circuits 141, 142 of process processing section 140 carry out, with respect to respective image pick-up signals $S_{ODD}/S_{EVEN}$, $S_{EVEN}/S_{ODD}$ alternately switched every field by the signal switching section 130, as shown in FIG. 15, process processing synchronous with synchronizing signal given by first synchronizing signal generator 161.

Namely, first process processing circuit 141 of the process processing section 140 implements, with respect to image pick-up signals $S_{ODD}/S_{EVEN}$ delivered from the signal switching section 130, on the basis of blanking pulse and/or synchronizing signal delivered from first synchronizing signal generator 161 of the drive control section 160, signal processing such as gain up, pedestal set, white clip, blanking cleaning and addition of synchronizing signal, etc. to thereby form television signal $S_{OUT1}$ in conformity with, e.g., NTSC system.

Moreover, second process processing circuit 142 of the process processing section 140 implements, with respect to image pick-up signals $S_{EVEN}/S_{ODD}$ delivered from the signal switching section 130, on the basis of blanking pulse and/or synchronizing signal delivered from first synchronizing signal generator 161 of the drive control section 160, signal processing such as gain up, pedestal set, white clip, blanking cleaning and addition of synchronizing signal, etc. to thereby form television signal $S_{OUT2}$, in the state where, e.g., the relationship between synchronizing signal and field in the NTSC system is judged.

The television signals $S_{OUT1}$, $S_{OUT2}$, formed from respective image pick-up signals $S_{ODD}/S_{EVEN}$, $S_{EVEN}/S_{ODD}$ in the process processing section 140 in this way are outputted from first and second output terminals 171, 172 through first and second output amplifiers 151, 152 of signal output section 150.

Also in the solid-state image pick-up apparatus of the fourth embodiment thus constituted, since an approach is employed to form television signals $S_{OUT1}$, $S_{OUT2}$, of 2 channels by first and second process processing circuits 141, 142 from image pick-up signal $S_{ODD}$ of odd line and image pick-up signal $S_{EVEN}$ of even line outputted every field through two signal output terminals 112, 113 of 2 line simultaneous read-out type solid-state image sensor 111 to output these television signals $S_{OUT1}$, $S_{OUT2}$, of 2 channels from output terminals 171, 172, it is possible to output all pixel information of the solid-state image sensor 111 every field.

It should be noted that in the case where television signals $S_{OUT1}$, $S_{OUT2}$, of 2 channels obtained by the solid-state image pick-up apparatus of the fourth embodiment are caused to undergo picture processing by picture processing unit 80 in the above-described imaging system shown in FIG. 7, since common synchronizing signal is added to the television signals $S_{OUT1}$, $S_{OUT2}$, of 2 channels similarly to the above-described second embodiment, respective field memory sections 81, 82 in the picture processing unit 80 can commonly use the control circuit thereof.

Figure 16:
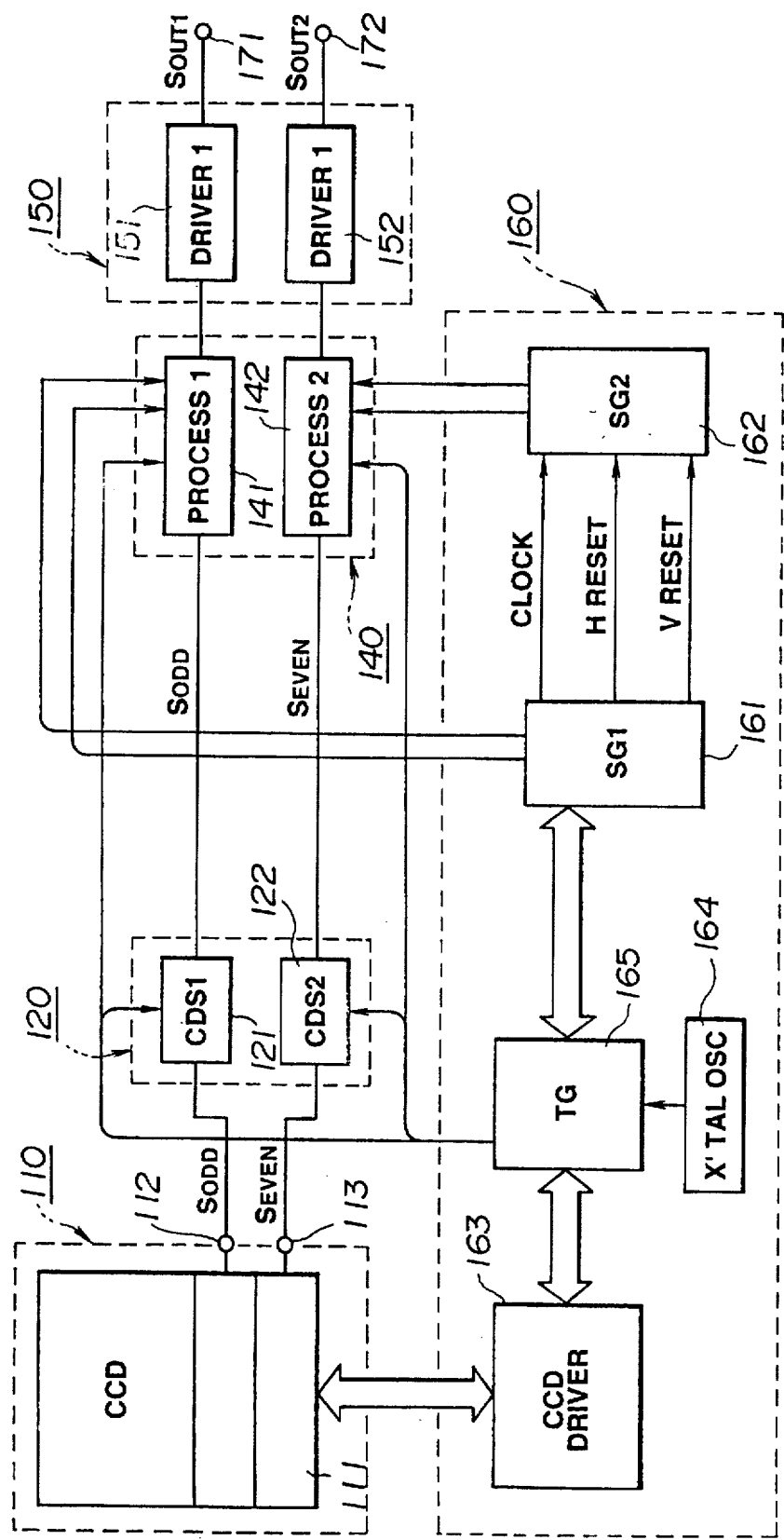
FIG. 16 is a block diagram showing the configuration of a fifth embodiment of a solid-state image pick-up apparatus according to this invention.

Further, a solid-state image pick-up apparatus according to this invention is constituted as in the fifth embodiment shown in FIG. 16, for example.

The solid-state image pick-up apparatus of the fifth embodiment shown in FIG. 16 is modification of the above-described third embodiment, wherein image pick-up signal $S_{ODD}$ of odd line and image pick-up signal $S_{EVEN}$ of even line outputted every field from two line simultaneous read-out type solid-state image sensor 111 of imaging section 110 are directly delivered from correlative double sampling processing section 120 to process processing section 140 so that process processing section 130 is omitted.

It is to be noted that, in the solid-state image pick-up apparatus of the fifth embodiment, the same reference numerals are respectively attached to the same components as those of the third embodiment in FIG. 16, and their detailed explanation is omitted.

Figure 17:
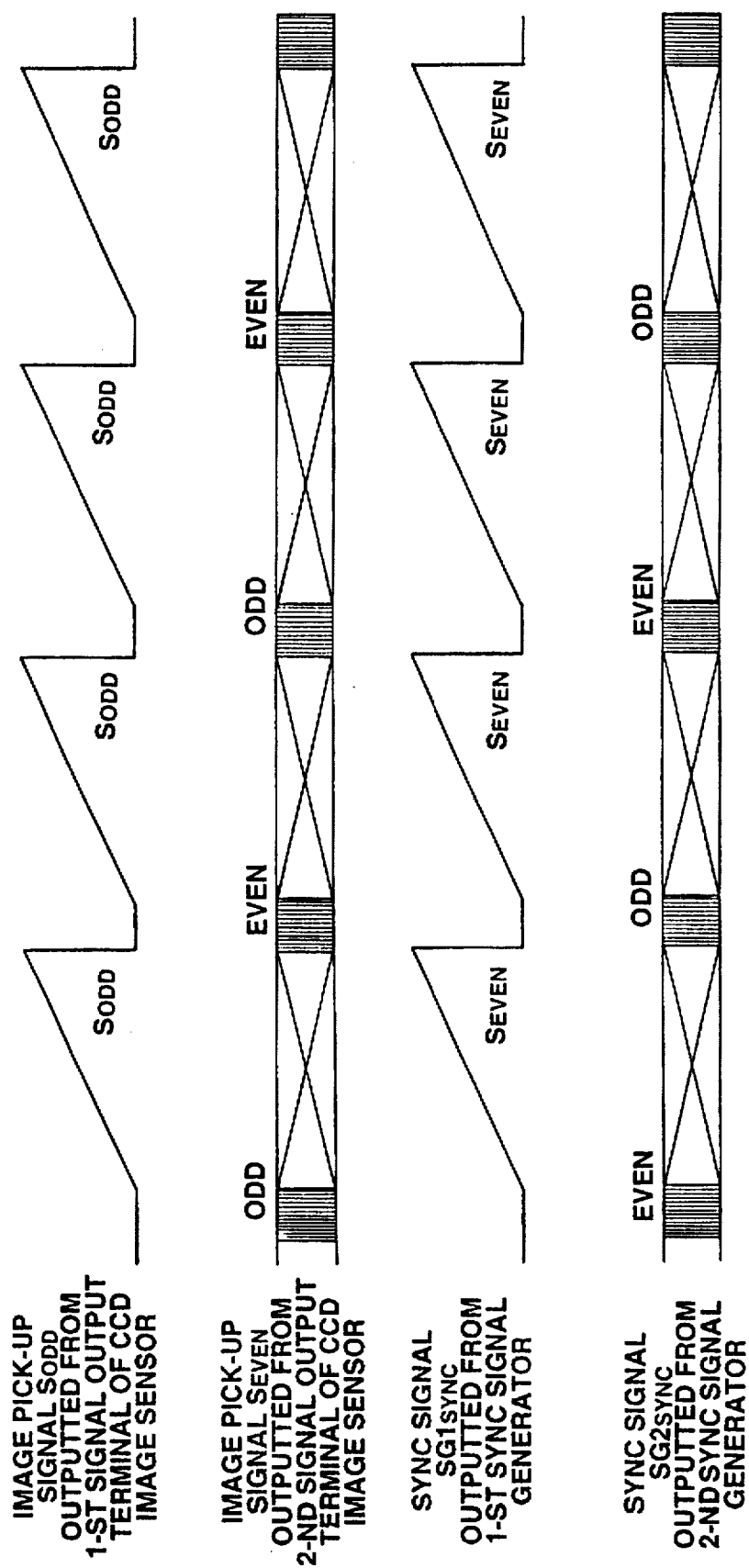
FIG. 17 is a timing chart showing the relationship between image pick-up signals $S_{ODD}$, $S_{EVEN}$ and synchronizing signals $SG1_{SYNC}$, $SG2_{SYNC}$ delivered to process processing section in the above-mentioned fifth embodiment.

In this solid-state image pick-up apparatus, the process processing section 140 carries out signal processing to form non-interlaced television signals $S_{OUT1}$, $S_{OUT2}$ of 2 channels from image pick-up signal $S_{ODD}$ of odd line and image pick-up signal $S_{EVEN}$ of even line as shown in FIG. 17 delivered through correlative double sampling processing section 120 from the imaging section 110.

Namely, first process processing circuit 141 of the process processing section 140 implements, with respect to image pick-up signal $S_{ODD}$ of odd line in which reset noise has been reduced by first correlative double sampling circuit 121 of the correlative double sampling processing section 120, on the basis of blanking pulse and/or synchronizing signal delivered from first synchronizing signal generator 161 of the drive control section 160, signal processing such as gain up, pedestal set, white clip, blanking cleaning and addition of synchronizing signal, etc. to thereby form non-interlaced television signal $S_{OUT1}$.

Moreover, second process processing circuit 142 implements, with respect to image pick-up signal $S_{EVEN}$ of even line in which reset noise has been reduced by second correlative double sampling circuit 122 of the correlative double sampling processing section 120, on the basis of blanking pulse and/or synchronizing signal delivered from second synchronizing signal generator 162 of the drive control section 160, signal processing such as gain up, pedestal set, white clip, blanking cleaning, and addition of synchronizing signal, etc. to thereby form non-interlaced television signal $S_{OUT2}$.

The non-interlaced television signals $S_{OUT1}$, $S_{OUT2}$ of 2 channels formed from respective image pick-up signals $S_{ODD}$, $S_{EVEN}$ in the process processing section 140 in this way are outputted from first and second output terminals 171, 172 through first and second output amplifiers 151, 152.

In the solid-state image pick-up apparatus of the fifth embodiment thus constituted, it is possible to output, from output terminals 171, 172, all pixel information of the solid-state image sensor 111 every field as non-interlaced television signals $S_{OUT1}$, $S_{OUT2}$ of 2 channels formed by first and second process processing circuits 141, 142 from image pick-up signal $S_{ODD}$ of odd line and image pick-up signal $S_{EVEN}$ of even line outputted every field through two signal output terminals 112, 113 of 2 line simultaneous read-out type solid-state image sensor 111.

Figure 18:
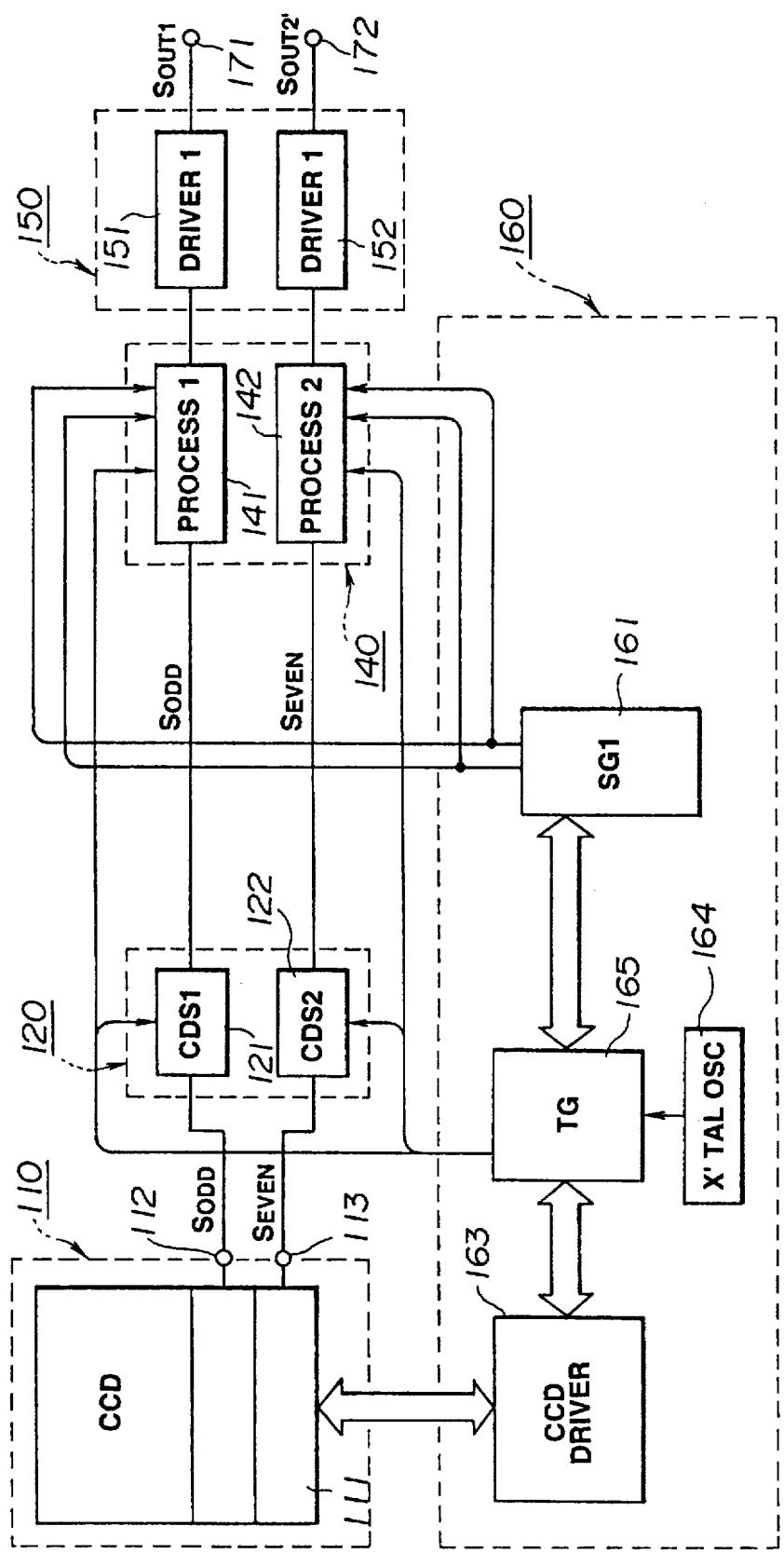
FIG. 18 is a block diagram showing the configuration of a sixth embodiment of a solid-state image pick-up apparatus according to this invention.

Further, a solid-state image pick-up apparatus according to this invention is constituted as in the sixth embodiment shown in FIG. 18, for example.

The solid-state image pick-up apparatus of the sixth embodiment shown in FIG. 18 is modification of the above-described fourth embodiment, wherein image pick-up signal $S_{ODD}$ of odd line and image pick-up signal $S_{EVEN}$ of even line outputted every field from 2 line simultaneous read-out type solid-state image sensor 111 of imaging section 110 are directly delivered from correlative double sampling processing section 120 to process processing section 140 so that signal switching section 130 is omitted.

It is to be noted that, in the solid-state image pick-up apparatus of the sixth embodiment, the same reference numerals are respectively attached to the same components as those of the fourth embodiment in FIG. 18, and their detailed explanation is omitted.

Figure 19:
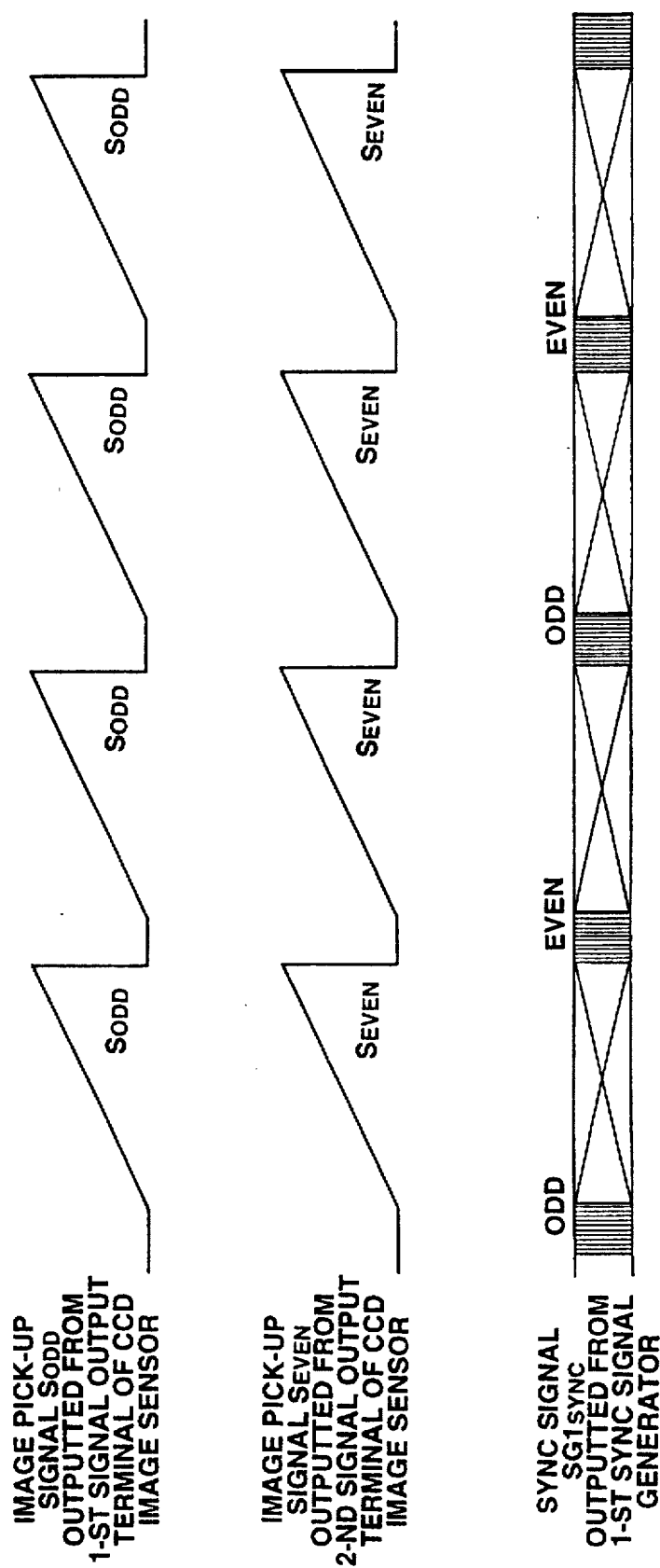
FIG. 19 is a timing chart showing the relationship between image pick-up signals $S_{ODD}$, $S_{EVEN}$ and synchronizing signal $SG1_{SYNC}$ delivered to process processing section in the above-mentioned sixth embodiment.

In this solid-state image pick-up apparatus, the process processing section 140 serves to carry out process processing synchronous with synchronizing signal given by first synchronizing signal generator 161, and forms non-interlaced television signals $S_{OUT1}$, $S_{OUT2}$, of 2 channels from image pick-up signal $S_{ODD}$ of odd line and image pick-up signal $S_{EVEN}$ of even line as shown in FIG. 19 delivered through correlative double sampling processing section 120 from the imaging section 110.

Namely, first process processing circuit 141 of the process processing section 140 implements, with respect to image pick-up signal $S_{ODD}$ of odd line in which reset noise has been reduced by first correlative double sampling circuit 121 of the correlative double sampling processing section 120, on the basis of blanking pulse and/or synchronizing signal delivered from first synchronizing signal generator 161 of the drive control section 160, signal processing such as gain up, pedestal set, white clip, blanking cleaning and addition of synchronizing signal, etc. to thereby form non-interlaced television signal $S_{OUT1}$.

Moreover, second process processing circuit 142 implements, with respect to image pick-up signal $S_{EVEN}$ of even line in which reset noise has been reduced by second correlative double sampling circuit 122 of the correlative double sampling processing section 120, on the basis of blanking pulse and/or synchronizing signal delivered from first synchronizing signal generator 161 of the drive control section 160, signal processing such as gain up, pedestal set, white clip, blanking cleaning and addition of synchronizing signal, etc. to thereby form non-interlaced television signal $S_{OUT2}$.

The non-interlaced television signals $S_{OUT1}$, $S_{OUT2}$, of 2 channels formed from respective image pick-up signals $S_{ODD}$, $S_{EVEN}$ in the process processing section 140 in this way are outputted from first and second output terminals 171, 172 through first and second output amplifiers 151, 152 of signal output section 150.

In the solid-state image pick-up apparatus of the sixth embodiment thus constituted, it is possible to output, from output terminals 171, 172, all pixel information of the solid-state image sensor 111 every field as non-interlaced television signals $S_{OUT1}$, $S_{OUT2}$, of 2 channels formed by first and second process processing circuits 141, 142 from image pick-up signal $S_{ODD}$ of odd line and image pick-up signal $S_{EVEN}$ of even line outputted every field through two signal output terminals 112, 113 of 2 line simultaneous read-out type solid-state image sensor 111.

What is claimed is:

1. An imaging system comprising:
    a solid-state image pick-up unit including:
        an imaging section having plurality of pixels arranged in a matrix formed of fields of odd and even lines and a two line simultaneous read-out type solid-state image sensor including two signal output terminals for outputting image pick-up information as image pick-up signals obtained by the plurality of pixels, the solid-state image sensor being such that image pick-up information of all pixels are read out every field, the solid-state image pick-up unit being operative to image an object on a carrying path by the solid-state image sensor to output image pick-up signals of two channels of different fields; and
        processing means for processing each image pick-up signal obtained by said imaging section into standard television signals, wherein said standard television signals include synchronization signals;
    a picture processing unit for processing said standard television signals processed by said processing means of said solid-state image pickup unit including:
        first and second field memory sections for respectively storing, as picture data, image pick-up signals of said two channels processed by said solid-state image pick-up unit, each of said first and second field memory sections including sync separating means for separating said synchronization signals from said standard television signals and timing generating means for timing, in accordance with said synchronization signals separated by said sync separating means, when said first and second field memory sections store said standard television signals; and
    picture processing section for generating picture data of one frame from said picture data which includes different fields stored in the first and second field memory sections, thereby carrying out picture processing.

* * * * *